United States Patent
Iijima et al.

(10) Patent No.: US 10,970,827 B2
(45) Date of Patent: Apr. 6, 2021

(54) IMAGE PROCESSOR AND IMAGE PROCESSING METHOD

(71) Applicant: PANASONIC INTELLECTUAL PROPERTY MANAGEMENT CO., LTD., Osaka (JP)

(72) Inventors: Tomokuni Iijima, Osaka (JP); Nobutoshi Fujinami, Osaka (JP); Shigeru Furumiya, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 53 days.

(21) Appl. No.: 16/593,593

(22) Filed: Oct. 4, 2019

(65) Prior Publication Data
US 2020/0175660 A1    Jun. 4, 2020

(30) Foreign Application Priority Data

Nov. 30, 2018    (JP) .............................. JP2018-225170

(51) Int. Cl.
*G06T 5/00*    (2006.01)
*G06T 7/90*    (2017.01)
(Continued)

(52) U.S. Cl.
CPC ................ *G06T 5/009* (2013.01); *G06T 5/50* (2013.01); *G06T 7/90* (2017.01); *G06T 11/001* (2013.01); *G06T 2207/20208* (2013.01)

(58) Field of Classification Search
CPC .. G06T 5/009; G06T 7/90; G06T 5/50; G06T 11/001; G06T 2207/20208;
(Continued)

(56) References Cited

U.S. PATENT DOCUMENTS

2011/0222793 A1    9/2011    Ueda et al.
2011/0254976 A1*   10/2011   Garten ................. G06F 3/1454
                                                348/229.1
(Continued)

FOREIGN PATENT DOCUMENTS

JP    2011-188277    9/2011
JP    2012-084960    4/2012
(Continued)

*Primary Examiner* — Phuoc Tran
(74) *Attorney, Agent, or Firm* — Greenblum & Bernstein, P.L.C.

(57) ABSTRACT

An image processor includes: an image sensor outputting a short exposure image and a long exposure image; a sensor controller that, when brightness of the subject changes, controls first exposure sensitivity to cause the short exposure image to have first brightness and controls second exposure sensitivity to cause the long exposure image to have second brightness; a motion blending ratio calculator calculating a motion blending ratio based on a motion amount of the subject; a motion-adapted image synthesizer generating a motion-adapted image by synthesizing a corrected short exposure image and the long exposure image based on the motion blending ratio; and an HDR image synthesizer generating an HDR image by synthesizing the motion-adapted image and the short exposure image together. When the subject becomes darker, the sensor controller controls the first and second exposure sensitivities to cause the first sensor gain to be at most the second sensor gain.

8 Claims, 22 Drawing Sheets

(51) Int. Cl.
  *G06T 5/50* (2006.01)
  *G06T 11/00* (2006.01)
(58) Field of Classification Search
  CPC . G06T 2207/10016; G06T 2207/10144; G06T 2200/21; G06T 2207/20201; G06T 2207/20221
  See application file for complete search history.

(56) References Cited

U.S. PATENT DOCUMENTS

| | | |
|---|---|---|
| 2012/0086829 A1 | 4/2012 | Hohjoh |
| 2012/0218442 A1* | 8/2012 | Jandhyala ................ G06T 5/50 348/239 |
| 2013/0051700 A1 | 2/2013 | Jo |
| 2015/0296116 A1* | 10/2015 | Tsuzuki ............ H04N 5/23254 348/208.1 |
| 2019/0191057 A1 | 6/2019 | Ono et al. |

FOREIGN PATENT DOCUMENTS

| | | |
|---|---|---|
| JP | 2013-066142 | 4/2013 |
| JP | 2014-229988 | 12/2014 |
| JP | 2016-139876 | 8/2016 |
| JP | 2016/167140 | 10/2016 |
| JP | 2016/175036 | 11/2016 |
| JP | 2017-224971 | 12/2017 |
| JP | 2018-050149 | 3/2018 |

* cited by examiner

IMAGE PROCESSOR AND IMAGE PROCESSING METHOD

CROSS REFERENCE TO RELATED APPLICATION

The present application is based on and claims priority of Japanese Patent Application No. 2018-225170 filed on Nov. 30, 2018.

BACKGROUND

1. Technical Field

The present disclosure relates to an image processor and an image processing method.

2. Description of the Related Art

As a technique of generating a high dynamic range (HDR) image having a wide dynamic range by synthesizing a plurality of images captured in different exposure times, known image processors are disclosed in Japanese Unexamined Patent Application Publication No. 2011-188277, Japanese Unexamined Patent Application Publication No. 2014-229988, and Japanese Unexamined Patent Application Publication No. 2012-84960.

In the image processor of Japanese Unexamined Patent Application Publication No. 2011-188277, a reference image and other images are compared with each other so as to detect dynamic regions included in the images. Furthermore, in the image processor, a dynamic region included in the reference image is replaced with a corresponding region of another image so as to generate a replaced image. An HDR image is generated by synthesizing the replaced image and the reference image. Thus, the HDR image is generated in consideration of a mobile object.

In the image processor of Japanese Unexamined Patent Application Publication No. 2014-229988, an HDR image is generated from a plurality of images of a moving subject. Specifically, in the image processor, a plurality of images are synthesized based on a composition ratio calculated according to an evaluation value for brightness, an evaluation value for a motion, and an evaluation value for a contrast. This can generate a natural HDR image even from a plurality of images of a moving subject.

In the image processor of Japanese Unexamined Patent Application Publication No. 2012-84960, an HDR image is generated by synthesizing a plurality of images including images of moving subjects at different brightness levels. Specifically, the image processor calculates motion data indicating a displacement amount between a reference image and a comparison image generated from the reference image and an image other than the reference image. Moreover, for the reference image and the comparison image, the image processor calculates a pixel mean value of each image block of a predetermined size and determines the composition ratio of the image block of the reference image and the image block of an image other than the reference image, which is associated with the image by the motion data, based on the result of comparison between a difference between the calculated pixel mean values and a predetermined threshold value. This generates an HDR image free from motion blur.

SUMMARY

However, the image processors according to the related art can be improved upon.

In view of this, the present disclosure provides an image processor and an image processing method that are capable of improving upon the above related art.

An image processor according to an aspect of the present disclosure generates a high dynamic range (HDR) image of a subject. The image processor includes: an image sensor that outputs (i) a first image of the subject captured with a first sensor gain in a first exposure time and (ii) a second image of the subject captured with a second sensor gain in a second exposure time longer than the first exposure time, the first image and the second image being output in one frame time; a sensor controller that, when a brightness of the subject changes, (i) controls a first exposure sensitivity to cause the first image to have a first brightness and (ii) controls a second exposure sensitivity to cause the second image to have a second brightness, the first exposure sensitivity being a product of the first exposure time multiplied by the first sensor gain, the second exposure sensitivity being a product of the second exposure time multiplied by the second sensor gain; a level adjuster that generates a corrected image from the first image by adjusting a luminance level of the first image to be substantially equal to a luminance level of the second image; a motion amount detector that detects a motion amount of the subject based on a difference in a pixel value between pixels co-located in the corrected image and the second image; a motion blending ratio calculator that calculates a motion blending ratio based on the motion amount, the motion blending ratio being a ratio of the corrected image to the second image when the corrected image is blended with the second image; a motion-adapted image synthesizer that generates a motion-adapted image by synthesizing the corrected image and the second image based on the motion blending ratio; and an HDR image synthesizer that generates the HDR image by synthesizing the motion-adapted image and the first image together, wherein when the subject becomes darker, the sensor controller controls the first exposure sensitivity and the second exposure sensitivity to cause the first sensor gain to be at most the second sensor gain.

These general and specific aspects may be implemented to a system, a method, an integrated circuit, a computer program, or a computer-readable recording medium such as a Compact Disc-Read Only Memory (CD-ROM), or may be any combination of them.

The image processor or the like according to the aspect of the present disclosure is capable of improving upon the above related art.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Figure 1:
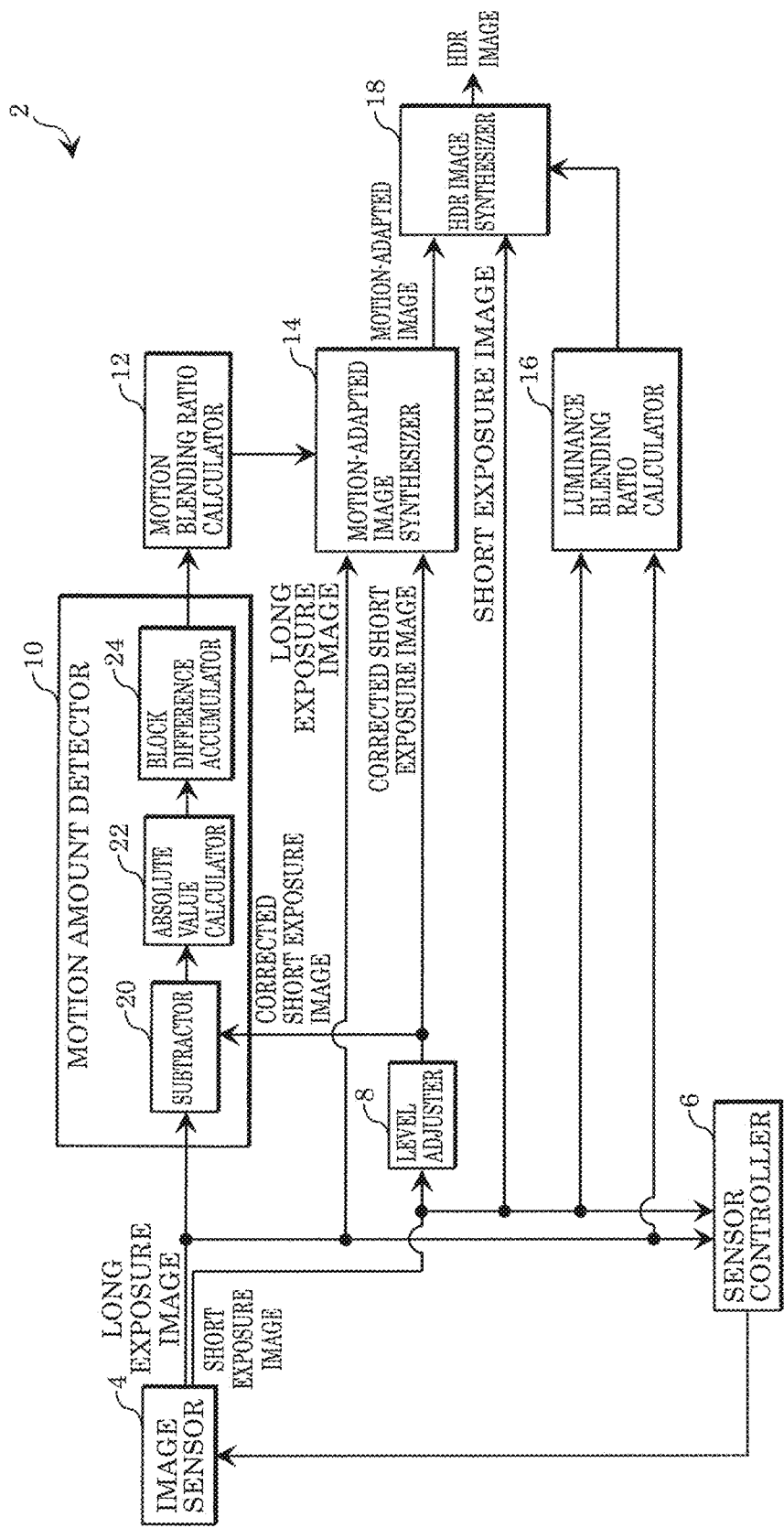
FIG. 1 is a block diagram showing a configuration of an image processor according to Embodiment 1.

In accordance with an aspect of the present disclosure, there is provided an image processor that generates a high dynamic range (HDR) image of a subject, the image processor including: an image sensor that outputs (i) a first image of the subject captured with a first sensor gain in a first exposure time and (ii) a second image of the subject captured with a second sensor gain in a second exposure time longer than the first exposure time, the first image and the second image being output in one frame time; a sensor controller that, when a brightness of the subject changes, (i) controls a first exposure sensitivity to cause the first image to have a first brightness and (ii) controls a second exposure sensitivity to cause the second image to have a second brightness, the first exposure sensitivity being a product of the first exposure time multiplied by the first sensor gain, the second exposure sensitivity being a product of the second exposure time multiplied by the second sensor gain; a level adjuster that generates a corrected image from the first image by adjusting a luminance level of the first image to be substantially equal to a luminance level of the second image; a motion amount detector that detects a motion amount of the subject based on a difference in a pixel value between pixels co-located in the corrected image and the second image; a motion blending ratio calculator that calculates a motion blending ratio based on the motion amount, the motion blending ratio being a ratio of the corrected image to the second image when the corrected image is blended with the second image; a motion-adapted image synthesizer that generates a motion-adapted image by synthesizing the corrected image and the second image based on the motion blending ratio; and an HDR image synthesizer that generates the HDR image by synthesizing the motion-adapted image and the first image together, wherein when the subject becomes darker, the sensor controller controls the first exposure sensitivity and the second exposure sensitivity to cause the first sensor gain to be at most the second sensor gain.

According to the aspect, the sensor controller controls the first exposure sensitivity and the second exposure sensitivity such that the first sensor gain is equal to or lower than the second sensor gain. Thus, the first exposure time is longer and the first sensor gain is lower than the related arts. Accordingly, noise decreases in the overall corrected image and the S/N of the corrected image improves. This can suppress noise caused by the corrected image in the HDR image, thereby improving the S/N of the HDR image.

For example, it is possible that the motion blending ratio calculator corrects the motion blending ratio to decrease a ratio of the corrected image to the second image in the motion-adapted image as the first sensor gain increases.

According to the aspect, the motion blending ratio calculator corrects the motion blending ratio such that the ratio of the corrected image in the motion-adapted image decreases as the first sensor gain increases. Thus, even if the first sensor gain increases, noise can be reduced in the HDR image. This can increase the S/N of the HDR image.

For example, it is also possible that the image processor further includes a flicker detector that detects a flicker value of the first image, and that the motion blending ratio calculator corrects the motion blending ratio to decrease a ratio of the corrected image to the second image in the motion-adapted image as the flicker value increases.

According to the aspect, the motion blending ratio calculator corrects the motion blending ratio such that the ratio of the corrected image in the motion-adapted image decreases as the flicker value increases. Thus, even if the first image has flicker, the occurrence of flicker in the HDR image can be suppressed. This can increase the S/N of the HDR image.

For example, it is further possible that the motion blending ratio calculator corrects the motion blending ratio to decrease a ratio of the corrected image to the second image in the motion-adapted image as the second exposure time decreases.

According to the aspect, the motion blending ratio calculator corrects the motion blending ratio such that the ratio of the corrected image to the motion-adapted image decreases with a reduction of the second exposure time. Thus, even if the second exposure time is reduced, the S/N of the HDR image can be increased.

In accordance with another aspect of the present disclosure, there is provided an image processing method for generating an HDR image of a subject, the method including: (a) outputting a first image of the subject captured with a first sensor gain in a first exposure time and a second image of the subject captured with a second sensor gain in a second exposure time longer than the first exposure time, the first image and the second image being output in one frame time; (b) controlling first exposure sensitivity to cause the first image to have a first brightness and controlling second exposure sensitivity to cause the second image to have a second brightness, the first exposure sensitivity being a product of the first exposure time multiplied by the first sensor gain, the second exposure sensitivity being a product of the second exposure time multiplied by the second sensor gain, the controlling of the first exposure sensitivity and second exposure sensitivity being performed when a brightness of the subject changes; (c) generating a corrected image from the first image by adjusting a luminance level of the first image to be substantially equal to a luminance level of the second image; (d) detecting a motion amount of the subject based on a difference in a pixel value between pixels co-located in the corrected image and the second image; (e) calculating a motion blending ratio based on the motion amount, the motion blending ratio being a ratio of the corrected image to the second image when the corrected image is blended with the second image; (f generating a motion-adapted image by synthesizing the corrected image and the second image based on the motion blending ratio; and (g) generating the HDR image by synthesizing the motion-adapted image and the first image together, wherein in the (b) controlling of the first exposure sensitivity and the second exposure sensitivity, when the subject becomes darker, the first exposure sensitivity and the second exposure sensitivity are controlled to cause the first sensor gain to be at most the second sensor gain.

According to the aspect, the first exposure sensitivity and the second exposure sensitivity are controlled such that the first sensor gain is equal to or lower than the second sensor gain. Thus, the first exposure time is longer and the first sensor gain is lower than the related arts. Accordingly, noise decreases in the overall corrected image and the S/N of the corrected image improves. This can suppress noise caused by the corrected image in the HDR image, thereby improving the S/N of the HDR image.

For example, it is possible that in the (e) calculating of the motion blending ratio, the motion blending ratio is corrected to decrease a ratio of the corrected image to the second image in the motion-adapted image as the first sensor gain increases.

According to the aspect, the motion blending ratio is corrected such that the ratio of the corrected image in the motion-adapted image decreases as the first sensor gain increases. Thus, even if the first sensor gain increases, noise can be reduced in the HDR image. This can increase the S/N of the HDR image.

For example, it is also possible that in the (e) calculating of the motion blending ratio, the motion blending ratio is corrected to decrease a ratio of the corrected image to the second image in the motion-adapted image as a flicker value of the first image increases.

According to the aspect, the motion blending ratio is corrected such that the ratio of the corrected image in the motion-adapted image decreases as the flicker value increases. Thus, even if the first image has flicker, the occurrence of flicker in the HDR image can be suppressed. This can increase the S/N of the HDR image.

For example, it is further possible that in the (e) calculating of the motion blending ratio, the motion blending ratio is corrected to decrease a ratio of the corrected image to the second image in the motion-adapted image as the second exposure time decreases.

According to the aspect, the motion blending ratio is corrected such that the ratio of the corrected image to the motion-adapted image decreases with a reduction of the second exposure time. Thus, even if the second exposure time is reduced, the S/N of the HDR image can be increased.

These general and specific aspects may be implemented to a system, a method, an integrated circuit, a computer program, or a computer-readable recording medium such as a Compact Disc-Read Only Memory (CD-ROM), or may be any combination of them.

Hereinafter, certain exemplary embodiments are described in greater detail with reference to the accompanying Drawings.

It should be noted that all the embodiments described below are generic and specific examples of the present disclosure. Numerical values, shapes, materials, constituent elements, arrangement positions and the connection configuration of the constituent elements, steps, the order of the steps, and the like described in the following embodiments are merely examples, and are not intended to limit the present disclosure. The present disclosure is characterized by the appended claims. Therefore, among the constituent elements in the following embodiments, constituent elements that are not described in independent claims that show the most generic concept of the present disclosure are described as elements constituting more desirable configurations.

Embodiment 1

[1-1. Configuration of Image Processor]

Figure 2:
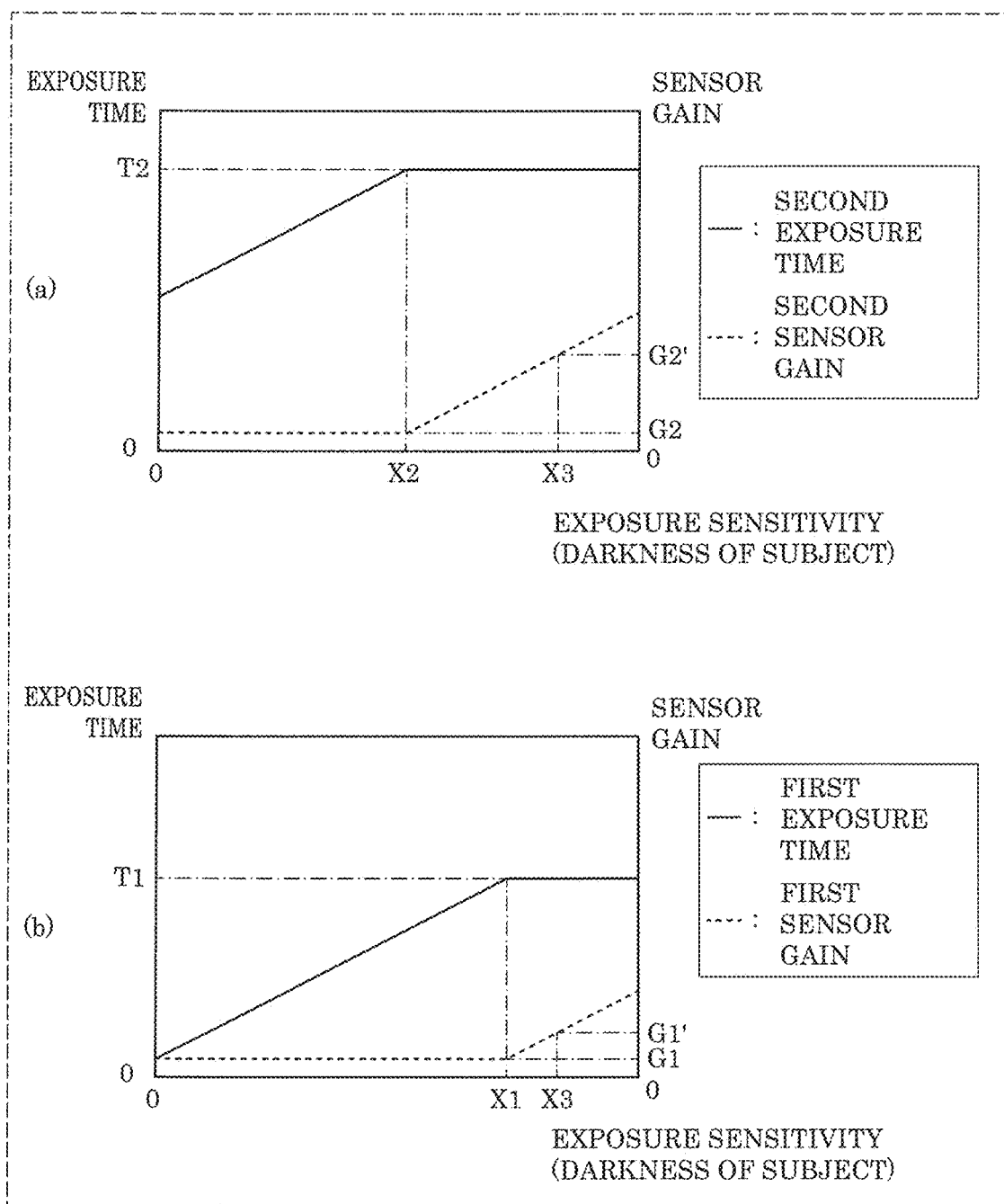
FIG. 2 is an explanatory drawing showing processing of a sensor controller of the image processor according to Embodiment 1.

Referring to FIGS. 1 and 2, a configuration of image processor 2 according to Embodiment 1 will be first described below. FIG. 1 is a block diagram showing the configuration of image processor 2 according to Embodiment 1. FIG. 2 is an explanatory drawing showing processing of sensor controller 6 of image processor 2 according to Embodiment 1.

As shown in FIG. 1, image processor 2 includes image sensor 4, sensor controller 6, level adjuster 8, motion amount detector 10, motion blending ratio calculator 12, motion-adapted image synthesizer 14, luminance blending ratio calculator 16, and HDR image synthesizer 18.

Image processor 2 is applied to, for example, a digital still camera, a digital video camera, an on-board object detection system, an on-board electronic mirror, and an on-board driving recorder.

Image sensor 4 is a so-called line-by-line image sensor that outputs a short exposure image (an example of a first image) and a long exposure image (an example of a second image) of a subject captured with varying exposure times and sensor gains in one frame time. Specifically, image sensor 4 outputs a short exposure image of a subject captured with a first sensor gain in a first exposure time and a long exposure image of a subject captured with a second sensor gain in a second exposure time. In this case, the second exposure time is longer than the first exposure time and the first sensor gain is not higher than the second sensor gain.

The exposure time means a time from a start to an end of charge storage by a photoelectric conversion element of image sensor 4 according to incident light. The sensor gain means the gain factor (amplification factor) of an amplifier for amplifying an image signal in image sensor 4. The exposure times or sensor gains are varied so as to change exposure sensitivity that is the product of the exposure time multiplied by the sensor gain.

Line-by-line image sensor 4 starts outputting a short exposure image immediately after completion of output of a long exposure image in each of first to last lines of a frame. In short, long exposure images and short exposure images are alternately output in one frame time.

As shown in FIG. 1, a long exposure image output from image sensor 4 is input to sensor controller 6, motion amount detector 10, motion-adapted image synthesizer 14, and luminance blending ratio calculator 16. Moreover, a short exposure image output from image sensor 4 is input to sensor controller 6, level adjuster 8, luminance blending ratio calculator 16, and HDR image synthesizer 18.

Sensor controller 6 controls the first exposure time, the first sensor gain, the second exposure time, and the second sensor gain of image sensor 4. Specifically, as shown in (a) in FIG. 2, sensor controller 6 controls second exposure sensitivity that is a product of the second exposure time multiplied by the second sensor gain such that the second exposure sensitivity increases as a subject becomes darker. As shown in (b) in FIG. 2, sensor controller 6 controls first exposure sensitivity that is a product of the first exposure time multiplied by the first sensor gain such that the first exposure sensitivity increases as the subject becomes darker. As shown in (a) and (b) in FIG. 2, sensor controller 6 controls the first exposure sensitivity and the second exposure sensitivity such that the first sensor gain is not higher than the second sensor gain when the subject becomes darker. In other words, sensor controller 6 controls the first exposure sensitivity and the second exposure sensitivity such that a short exposure image has first brightness and a long exposure image has second brightness when the brightness of the subject changes.

In the example of (a) in FIG. 2, when the exposure sensitivity is lower than X2, the second exposure time gradually increases and the second sensor gain is kept at G2, whereas when the exposure sensitivity is not lower than X2, the second exposure time is kept at T2 and the second sensor gain gradually increases. In the example of (b) in FIG. 2, when the exposure sensitivity is lower than X1 (>X2), the first exposure time gradually increases and the first sensor gain is kept at G1 (=G2), whereas when the exposure sensitivity is not lower than X1, the first exposure time is kept at T1 (<T2) and the first sensor gain gradually increases.

At this point, as described above, sensor controller 6 controls the first exposure sensitivity and the second exposure sensitivity such that the first sensor gain is equal to or lower than the second sensor gain. For example, as shown in (a) and (b) in FIG. 2, when the exposure sensitivity is X3 (>X1), first sensor gain G1' is lower than second sensor gain G2'.

Level adjuster 8 adjusts the luminance level of a short exposure image output from image sensor 4 to be substantially equal to the luminance level of a long exposure image, thereby generating a corrected short exposure image (an example of a corrected image) from the short exposure image. Specifically, level adjuster 8 raises the gain of a signal indicating the short exposure image according to the ratio of the second exposure sensitivity and the first exposure sensitivity, so that the luminance level of the short exposure image rises to or close to that of a long exposure image. Level adjuster 8 outputs the generated corrected short exposure image to motion amount detector 10 and motion-adapted image synthesizer 14.

Motion amount detector 10 detects a motion amount, which indicates the amount of a motion of a subject, based on the corrected short exposure image and the long exposure image. Motion amount detector 10 includes subtractor 20, absolute value calculator 22, and block difference accumulator 24.

Subtractor 20 calculates a difference between the long exposure image output from image sensor 4 and the corrected short exposure image output from level adjuster 8. Specifically, subtractor 20 outputs a difference that is a result of subtraction of the pixel value of a pixel in the corrected short exposure image from the pixel value of a pixel in the long exposure image, the pixels being located at the same position. Subtractor 20 performs the subtraction on all the pixels of the long exposure image and the corrected short exposure image. Subtractor 20 outputs the calculated difference to absolute value calculator 22.

Absolute value calculator 22 calculates the absolute value of the difference from subtractor 20. The absolute value of the difference indicates a size of a pixel value difference between the pixels co-located in the long exposure image and the short exposure image. Absolute value calculator 22 outputs the calculated absolute value of the difference to block difference accumulator 24.

Block difference accumulator 24 accumulates the absolute values of differences from absolute value calculator 22 for each image block. The image block is a unit when the overall region of the long exposure image (or corrected short exposure image) is divided into, for example, n×n pixels (n Z 2). The larger the motion of a subject in the second exposure time is, the larger the absolute value of a difference from absolute value calculator 22 is, the absolute value being increased by blurring of a subject image in the long exposure image. In other words, the larger the motion of a subject is, the larger the accumulated value of an image block including the motion is. Block difference accumulator 24 detects an accumulated value, which is calculated for each image block, as a motion amount of a subject. Block difference accumulator 24 outputs a motion amount detected for each image block, to motion blending ratio calculator 12.

Motion blending ratio calculator 12 calculates a blending ratio based on a motion amount detected for each image block. The motion blending ratio is a ratio of the corrected short exposure image to the long exposure image regarding pixels co-located in these images. Motion blending ratio calculator 12 outputs the calculated motion blending ratio to motion-adapted image synthesizer 14.

Steps of calculating a motion blending ratio will be discussed below. First, motion blending ratio calculator 12 smoothes motion amounts between image blocks. Specifically, motion blending ratio calculator 12 fragments differences in motion amount between adjacent image blocks and interpolates the motion amounts of pixels so as to allocate the differences in motion amount according to a distance between each pixel and the barycenter of the image block. Subsequently, motion blending ratio calculator 12 calculates a motion blending ratio for pixels co-located in the long exposure image and the corrected short exposure image such that a blending ratio of the corrected short exposure image to the long exposure image has a positive correlation with the motion amount of a subject. This is because a subject image is likely to blur in the long exposure image in the image block where a large motion amount of a subject is detected.

As a result of the smoothing, a change of a motion amount between pixels is smoothed across the boundary of the image blocks and thus the calculated motion blending ratio between pixels also smoothly changes across the boundary between the image blocks. In other words, the motion blending ratio of the short exposure image to the long exposure image is determined for each pixel instead of each image block. This can suppress blockiness in a motion-adapted image (will be described later) after synthesis.

Motion-adapted image synthesizer 14 generates a motion-adapted image by synthesizing, based on the motion blending ratio from motion blending ratio calculator 12, the long exposure image output from image sensor 4 and the corrected short exposure image output from level adjuster 8. Specifically, motion-adapted image synthesizer 14 performs alpha blending on the pixel of the long exposure image and the pixel of the corrected short exposure image by using the motion blending ratio of each pixel as a coefficient. At this point, in a region where a subject image considerably blurs in the long exposure image, the corrected short exposure image is blended with the long exposure image in a high motion blending ratio. This can correct blurring of the subject image in the long exposure image. In a region where a subject image hardly blurs in the long exposure image, the corrected short exposure image is blended with the long exposure image in a low motion blending ratio. The blending is performed to avoid unnecessary deterioration of image quality in a region where a subject image hardly blurs in the long exposure image. This is because the S/N of the corrected short exposure image is lower than that of the long exposure image. Motion-adapted image synthesizer 14 outputs the generated motion-adapted image to HDR image synthesizer 18.

Based on the long exposure image and the short exposure image output from image sensor 4, luminance blending ratio calculator 16 calculates a luminance blending ratio of the short exposure image to the long exposure image regarding pixels co-located in these images. Luminance blending ratio calculator 16 outputs the calculated luminance blending ratio to HDR image synthesizer 18.

HDR image synthesizer 18 generates an HDR image by synthesizing the motion-adapted image output from motion-adapted image synthesizer 14 and the short exposure image output from image sensor 4, based on the luminance blending ratio from luminance blending ratio calculator 16. HDR image synthesizer 18 performs alpha blending on the pixel of the motion-adapted image and the pixel of the short exposure image by using the luminance blending ratio of each pixel as a coefficient. This can adaptively generate an HDR image for a motion of a subject and the luminance of each pixel in the long exposure image and the short exposure image.

[1-2. Operations of Image Processor]

Figure 3:
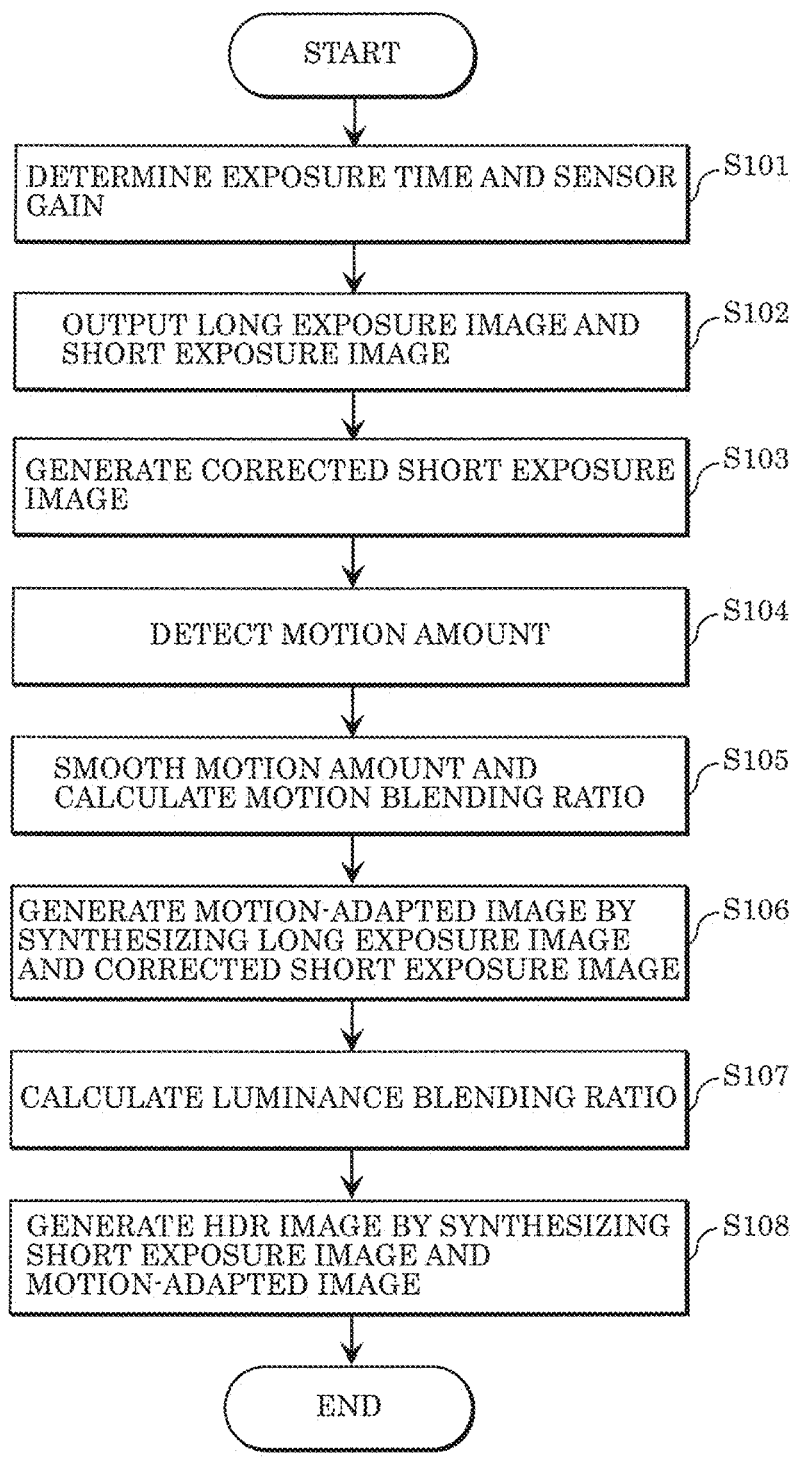
FIG. 3 is a flowchart showing a flow of operations of the image processor according to Embodiment 1.
Figure 4A:
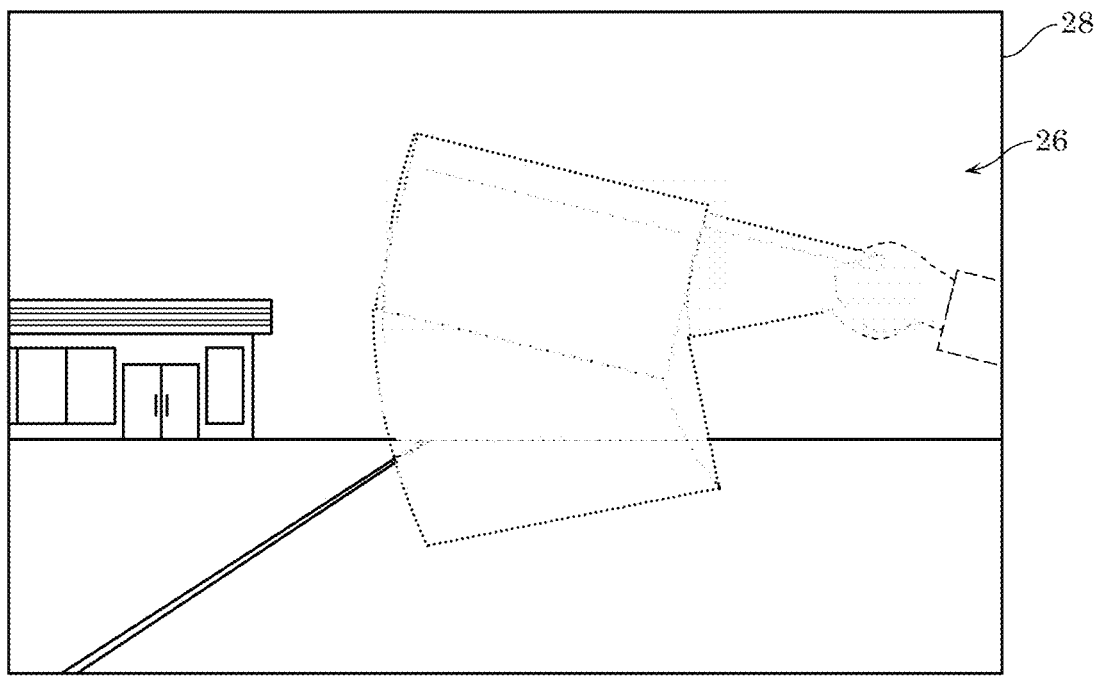
FIG. 4A is a schematic view showing an example of a long exposure image according to Embodiment 1.
Figure 4B:
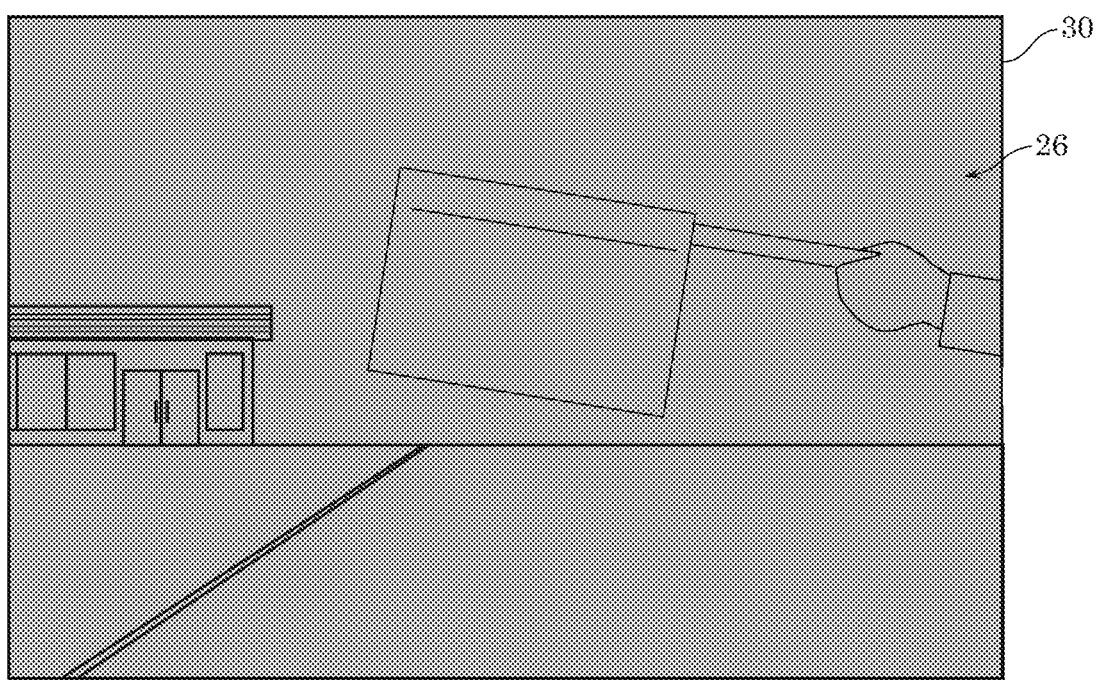
FIG. 4B is a schematic view showing an example of a short exposure image according to Embodiment 1.
Figure 4C:
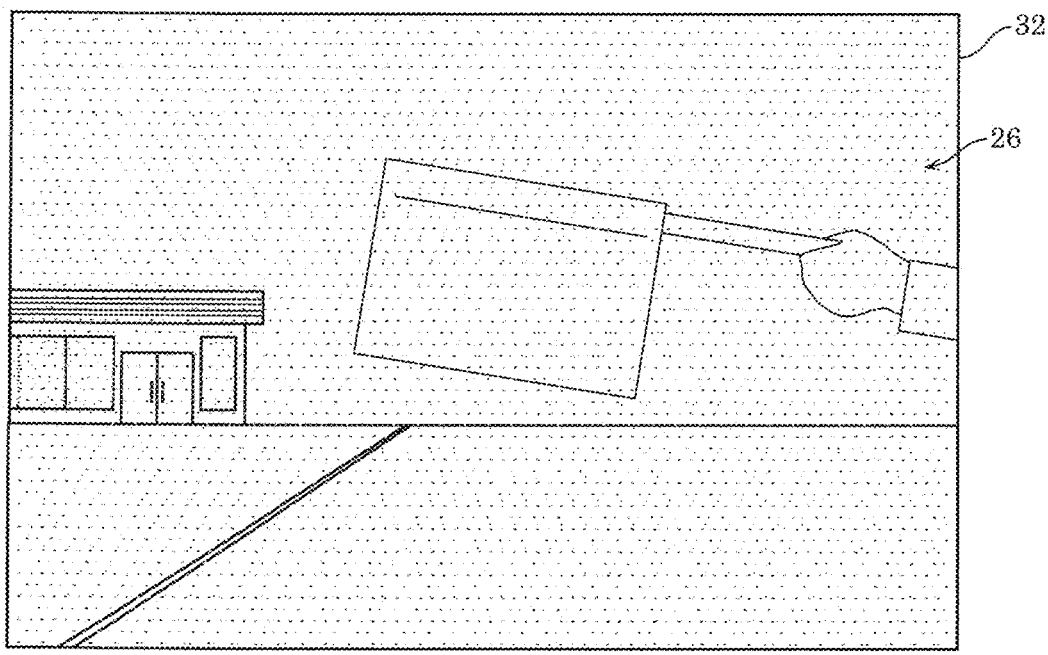
FIG. 4C is a schematic view showing an example of a corrected short exposure image according to Embodiment 1.
Figure 4D:
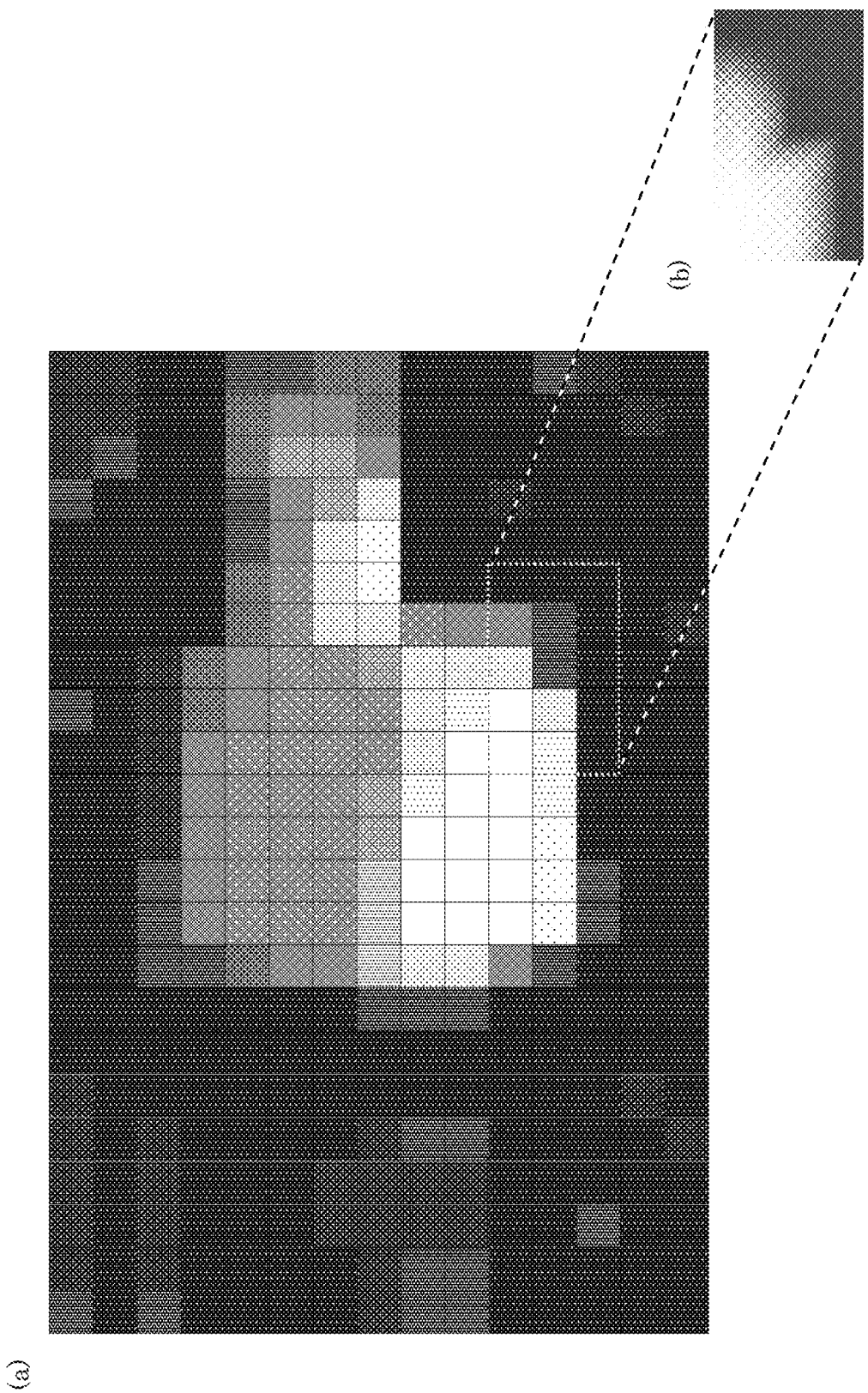
FIG. 4D is a schematic view showing an example of a motion amount distribution of a subject detected by a motion amount detector according to Embodiment 1.
Figure 4E:
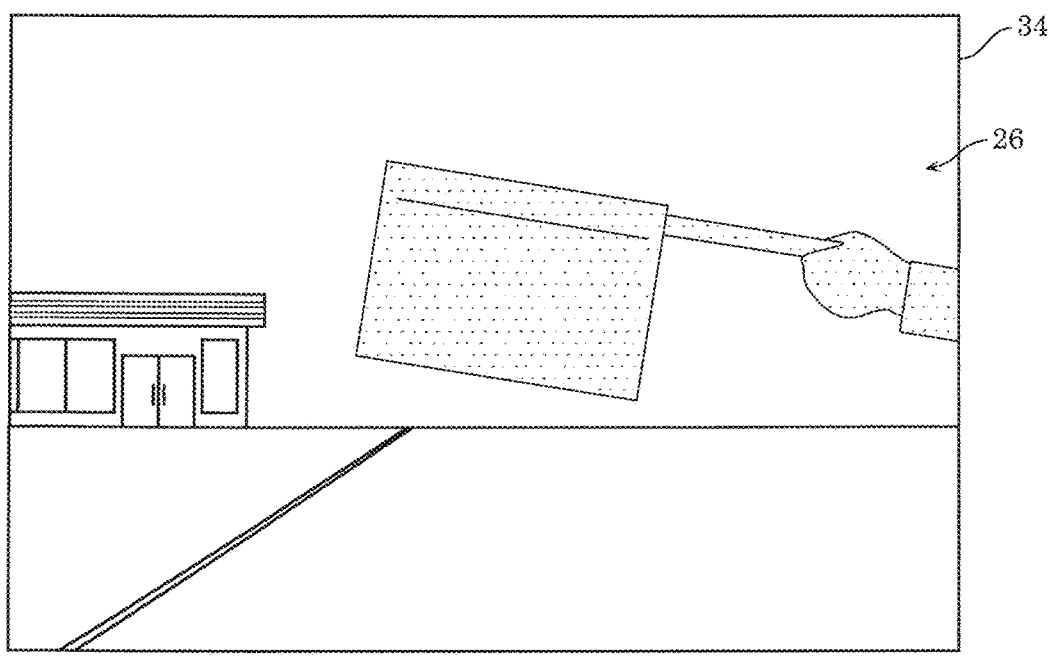
FIG. 4E is a schematic view showing an example of an HDR image generated by the image processor according to Embodiment 1.

Referring to FIGS. 3 to 4E, Operations of image processor 2 according to Embodiment 1 will be described below. FIG. 3 is a flowchart showing a flow of the operations of image processor 2 according to Embodiment 1. FIG. 4A is a schematic diagram showing an example of long exposure image 28 according to Embodiment 1. FIG. 4B is a schematic diagram showing an example of short exposure image 30 according to Embodiment 1. FIG. 4C is a schematic view showing an example of corrected short exposure image 32 according to Embodiment 1. FIG. 4D is a schematic view showing an example of a motion amount distribution of a subject detected by motion amount detector 10 according to Embodiment 1. FIG. 4E is a schematic view showing an example of HDR image 34 generated by image processor 2 according to Embodiment 1.

As shown in FIG. 3, sensor controller 6 first determines the first exposure time and the first sensor gain (first exposure sensitivity) and the second exposure time and the second sensor gain (second exposure sensitivity) of image sensor 4 according to the brightness of a subject (S101). Image sensor 4 outputs short exposure image 30 of subject 26 captured with the first sensor gain determined by sensor controller 6 in the first exposure time determined by sensor controller 6, and outputs long exposure image 28 of subject 26 with the second sensor gain captured in the second exposure time (S102).

For example, image sensor 4 captures images of subject 26 as illustrated in FIGS. 4A and 4B. In the examples of FIGS. 4A and 4B, the close view of subject 26 shows a flag held by a hand of a person crossing a road and the distance view of subject 26 shows a building facing a road. At this point, the flag held by the hand of the person is slightly raised.

Image sensor 4 outputs, for example, long exposure image 28 as illustrated in FIG. 4A. As illustrated in FIG. 4A, long exposure image 28 is captured in the second exposure time longer than the first exposure time and thus long exposure image 28 is entirely brighter than short exposure image 30 (see FIG. 4B). In long exposure image 28, an image of moving subject 26 (the hand and the flag) blurs but an image of fixed subject 26 (e.g., a building) is clearly captured. In FIG. 4A, an edge of the blurred image of subject 26 is indicated by broken lines, whereas an edge of the clear image of subject 26 is indicated by solid lines.

Moreover, image sensor 4 outputs, for example, short exposure image 30 as illustrated in FIG. 4B. As illustrated in FIG. 4B, short exposure image 30 is captured in the first exposure time shorter than the second exposure time and thus is entirely darker than long exposure image 28 (see FIG. 4A). Blur hardly occurs in the overall image of subject 26.

Returning to FIG. 3, level adjuster 8 adjusts the luminance level of short exposure image 30 output from image sensor 4 to be substantially equal to the luminance level of long exposure image 28, thereby generating corrected short exposure image 32 from short exposure image 30 (S103).

Level adjuster 8 generates, for example, corrected short exposure image 32 as illustrated in FIG. 4C. As illustrated in FIG. 4C, corrected short exposure image 32 is nearly as bright as long exposure image 28 and is entirely brighter than short exposure image 30 before the luminance level is adjusted. If the luminance level is raised, noise may occur in overall corrected short exposure image 32. In FIG. 4C, dots indicate the noise of corrected short exposure image 32.

Returning to FIG. 3, motion amount detector 10 detects a motion amount of subject 26 for each image block of long exposure image 28 (or corrected short exposure image 32) by calculating a difference between long exposure image 28 output from image sensor 4 and corrected short exposure image 32 output from level adjuster 8 (S104).

Motion amount detector 10 detects a motion amount of subject 26 for each image block as illustrated in, for example, FIG. 4D. In (a) in FIG. 4D, each section indicates an image block. In the example of (a) in FIG. 4D, an image block having a large motion amount becomes brighter. Specifically, an image block becomes brighter as a difference between the pixel value of long exposure image 28 and the pixel value of short exposure image 32 increases. In FIG. 4D, the motion amount is indicated by the density of shading. The larger the motion amount is, the lower the density of shading is.

Returning to FIG. 3, motion blending ratio calculator 12 calculates a motion blending ratio by smoothing the motion amounts of image blocks (S105). Thus, as illustrated in (b) in FIG. 4D, the motion amount more smoothly changes across a boundary between the image blocks than in (a) in FIG. 4D before the smoothing.

Subsequently, motion-adapted image synthesizer 14 generates a motion-adapted image by synthesizing, based on the motion blending ratio from motion blending ratio calculator 12, long exposure image 28 output from image sensor 4 and corrected short exposure image 32 output from level adjuster 8 (S106). Thus, regarding pixels constituting a hardly blurring image of subject 26 in long exposure image 28, corrected short exposure image 32 are blended with the long exposure image in a low motion blending ratio, whereas regarding pixels constituting a largely blurring image of subject 26 in long exposure image 28, corrected short exposure image 32 are blended with the long exposure image in a high motion blending ratio. In a region where an image of subject 26 does not blur in long exposure image 28, the pixels of long exposure image 28 having a higher S/N may be used as they are without blending the pixels of corrected short exposure image 32.

Based on long exposure image 28 and short exposure image 30 output from image sensor 4, luminance blending ratio calculator 16 calculates a luminance blending ratio (S107). HDR image synthesizer 18 generates HDR image 34 by synthesizing the motion-adapted image output from motion-adapted image synthesizer 14 and short exposure image 30 output from image sensor 4, based on the luminance blending ratio from luminance blending ratio calculator 16. HDR image synthesizer 18 generates, for example, HDR image 34 as illustrated in FIG. 4E. As illustrated in FIG. 4E, in HDR image 34, an image of largely blurring subject 26 (a hand and a flag) in long exposure image 28 is replaced with an image of subject 26 (a hand and a flag) in corrected short exposure image 32. At this point, in the image of the hand and the flag in HDR image 34, noise slightly occurs due to corrected short exposure image 32. In FIG. 4E, dots indicate the noise of HDR image 34.

[1-3. Effect]

Figure 5:
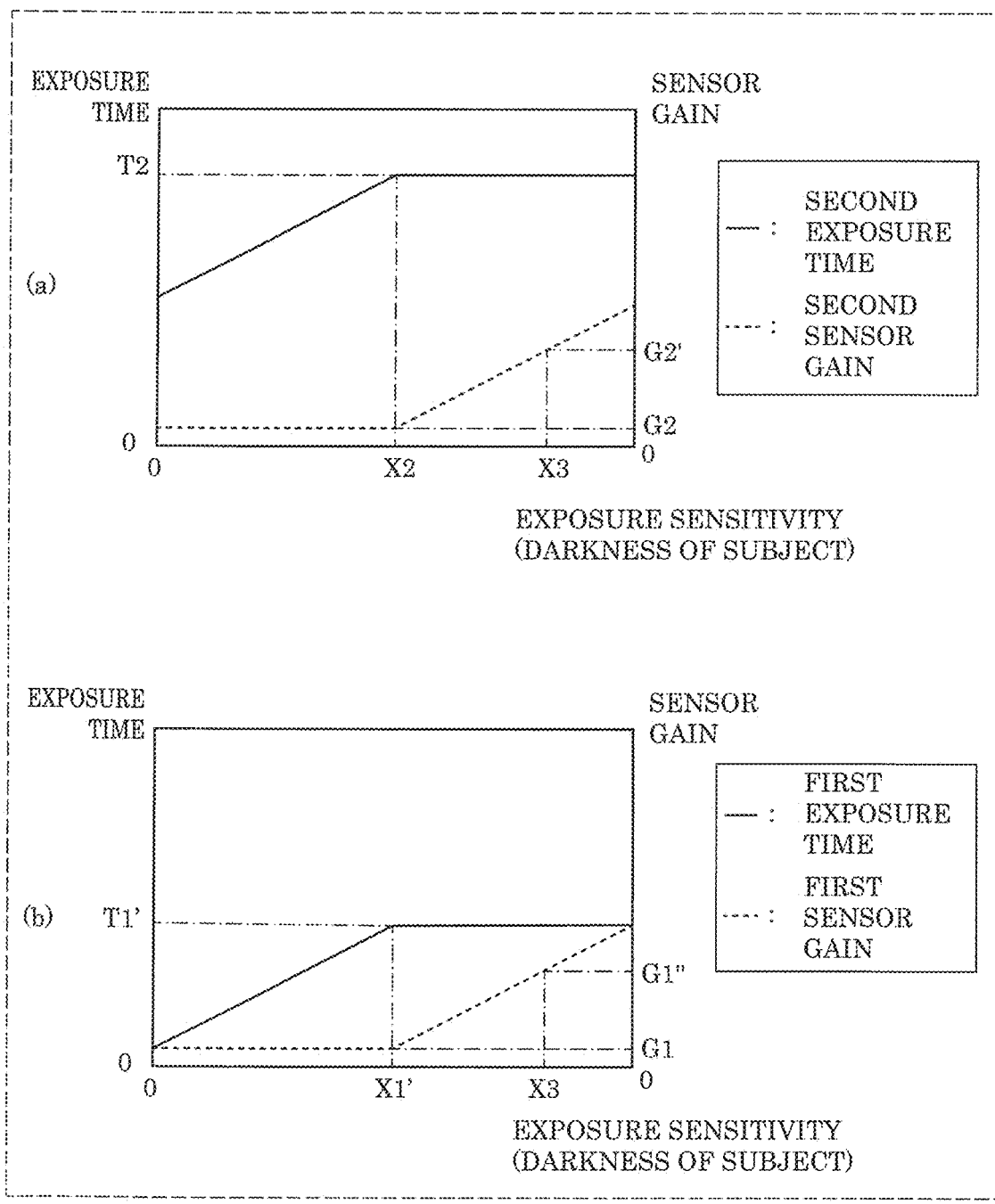
FIG. 5 is an explanatory drawing showing processing of a sensor controller of an image processor according to a Comparative Example.
Figure 6:
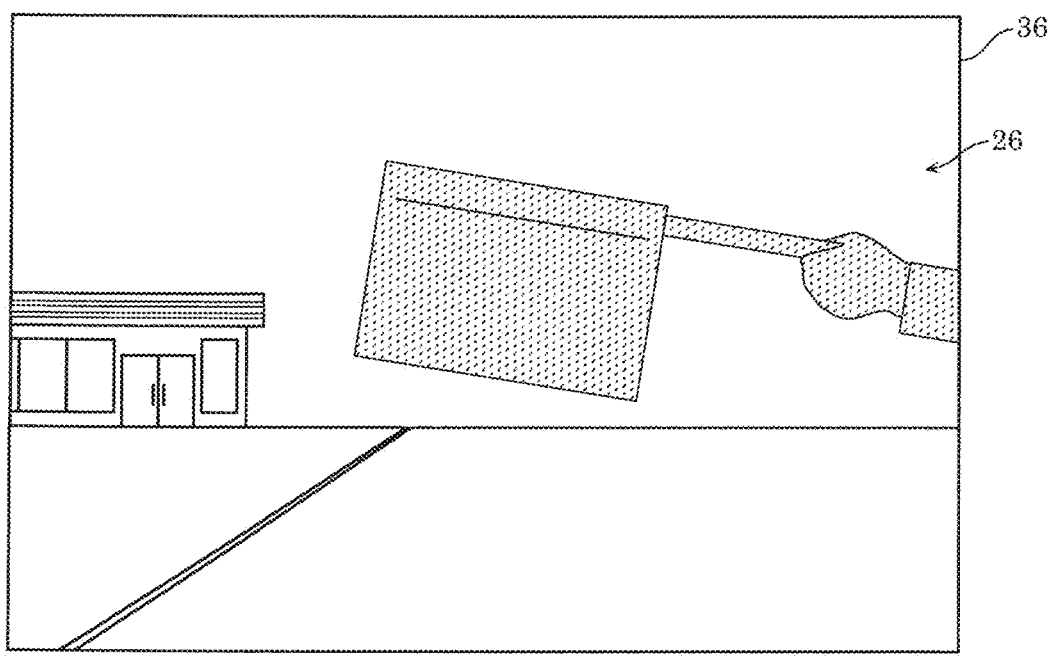
FIG. 6 is a schematic view illustrating an example of an HDR image generated by the image processor according to the Comparative Example.

Referring to FIGS. 5 and 6, an image processor according to a Comparative Example will be described here. FIG. 5 is an explanatory drawing showing processing of a sensor controller of the image processor according to the Comparative Example. FIG. 6 is a schematic view illustrating an example of HDR image 36 generated by the image processor according to the Comparative Example.

As shown in FIG. 5, the image processor according to the Comparative Example is different from the present embodiment in control of first exposure sensitivity by a sensor controller. Specifically, as shown in (a) and (b) in FIG. 5, a sensor controller controls the first exposure sensitivity and second exposure sensitivity such that a first sensor gain is equal to a second sensor gain. The graph of a second exposure time and the second sensor gain in (a) in FIG. 5 is identical to the graph of the second exposure time and the second sensor gain in (a) in FIG. 2.

In the example of (b) in FIG. 5, when the exposure sensitivity is lower than X1' (=X2), the first exposure time gradually increases and the first sensor gain is kept at G1, whereas when the exposure sensitivity is not lower than X'1, the first exposure time is kept at T1' (<T2) and the first sensor gain gradually increases. When the exposure sensitivity is X3 (>X1'), first sensor gain G1" is equal to second sensor gain G2'. At this point, first exposure time T1' is shorter than first exposure time T1 in (b) in FIG. 2 and first sensor gain G1" is higher than first sensor gain G1' in (b) in FIG. 2.

In the image processor according to the Comparative Example, first exposure time T1' is shorter and first sensor gain G1" is higher than Embodiment 1. Accordingly, more noise occurs in an overall corrected short exposure image and the S/N of the corrected short exposure image decreases. Thus, as illustrated in FIG. 6, more noise occurs due to the corrected short exposure image in an image of a hand and a flag in HDR image 36 generated by the image processor according to the Comparative Example. In FIG. 6, dots indicate the noise of HDR image 36.

In contrast, in image processor 2 according to Embodiment 1, sensor controller 6 controls the first exposure sensitivity and the second exposure sensitivity such that the first sensor gain is equal to or lower than the second sensor gain. Thus, in image processor 2 according to Embodiment 1, first exposure time T1 is longer and first sensor gain G1' is lower than those of the image processor according to the Comparative Example. Accordingly, noise decreases in overall corrected short exposure image 32 and the S/N of corrected short exposure image 32 improves. Thus, as illustrated in FIG. 4E, in HDR image 34 generated by image processor 2 according to Embodiment 1, noise only slightly occurs due to corrected short exposure image 32 in an image of a hand and a flag.

Therefore, image processor 2 according to Embodiment 1 can improve the S/N of HDR image 34, thereby generating HDR image 34 of higher quality.

Embodiment 2

[2-1. Configuration of Image Processor]

Figure 7:
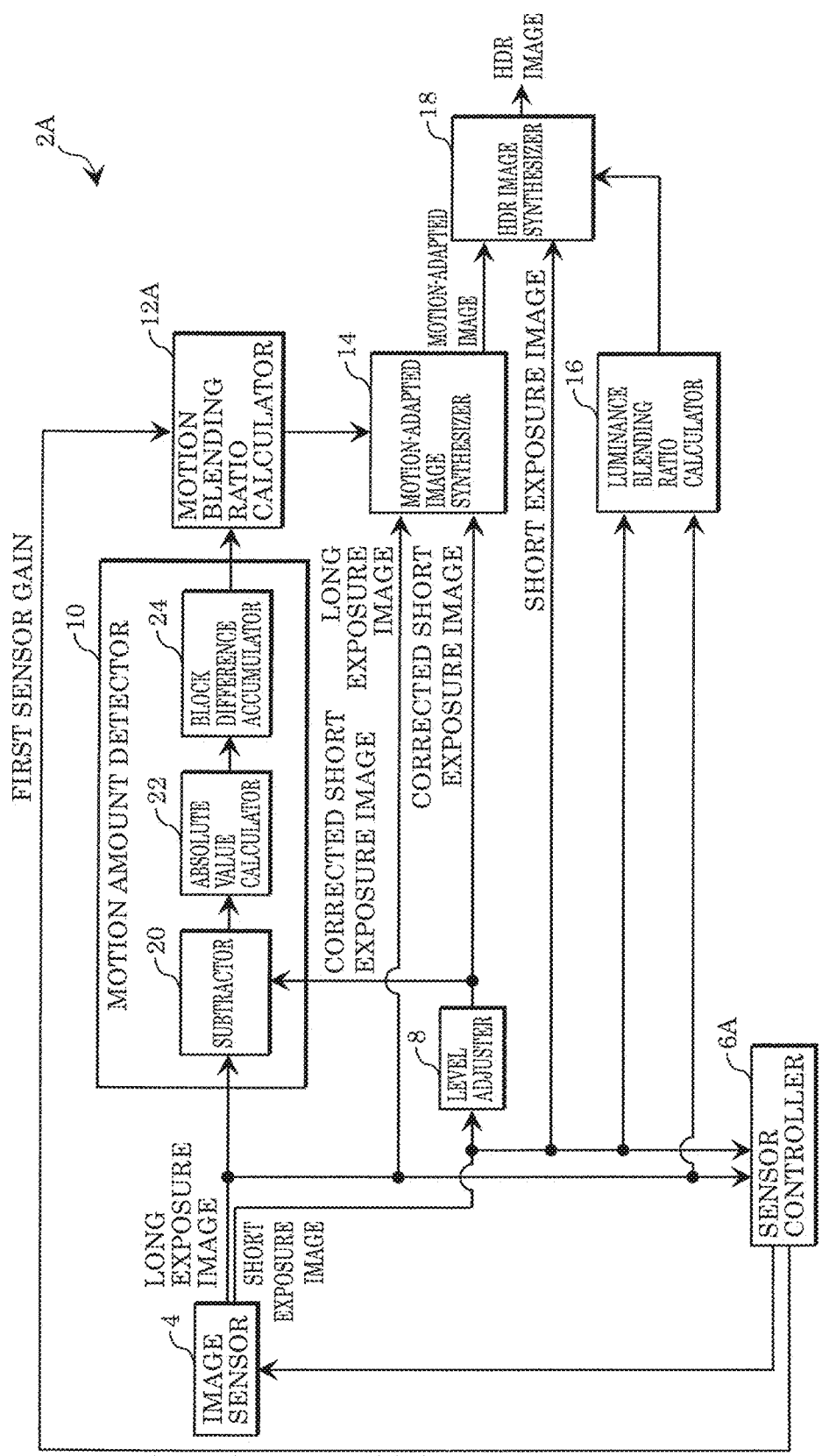
FIG. 7 is a block diagram showing a configuration of an image processor according to Embodiment 2.
Figure 8:
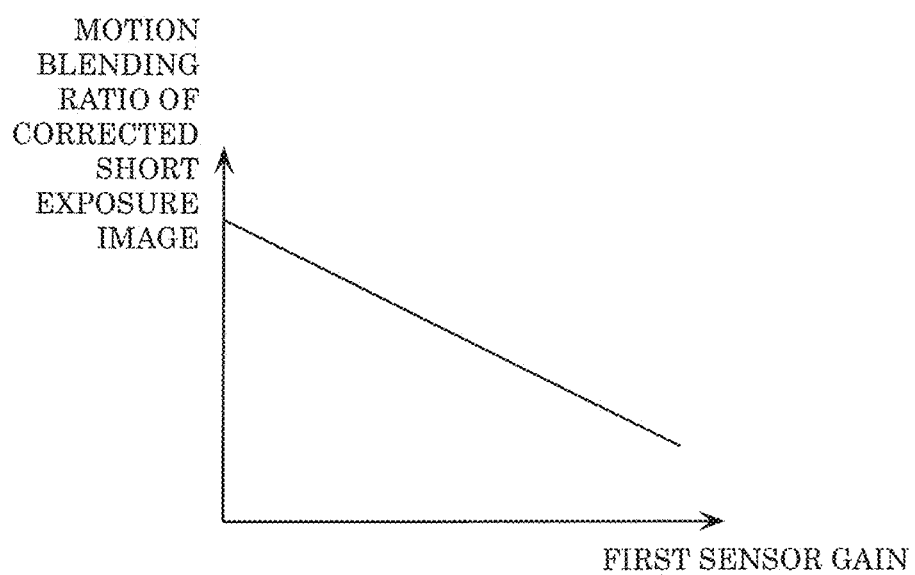
FIG. 8 is an explanatory drawing showing processing of a motion blending ratio calculator of the image processor according to Embodiment 2.

Referring to FIGS. 7 and 8, a configuration of image processor 2A according to Embodiment 2 will be described below. FIG. 7 is a block diagram showing the configuration of image processor 2A according to Embodiment 2.

FIG. 8 is an explanatory drawing showing processing of motion blending ratio calculator 12A of image processor 2A according to Embodiment 2. In the following embodiments, the same constituent elements as those of Embodiment 1 are indicated by the same reference numerals and the explanation thereof is omitted.

As shown in FIG. 7, image processor 2A according to Embodiment 2 is different from Embodiment 1 in processing of sensor controller 6A and motion blending ratio calculator 12A.

When determining a first exposure time, a first sensor gain, a second exposure time, and a second sensor gain of image sensor 4 according to brightness of a subject, sensor controller 6A outputs information on the determined first sensor gain to motion blending ratio calculator 12A.

Motion blending ratio calculator 12A corrects a motion blending ratio based on the information on the first sensor gain from sensor controller 6A. Specifically, as shown in FIG. 8, motion blending ratio calculator 12A corrects the motion blending ratio such that the ratio of a corrected short exposure image to a long exposure image in a motion-adapted image (in other words, the motion blending ratio of the corrected short exposure image to the long exposure image) decreases as the first sensor gain increases.

[2-2. Operations of Image Processor]

Figure 9:
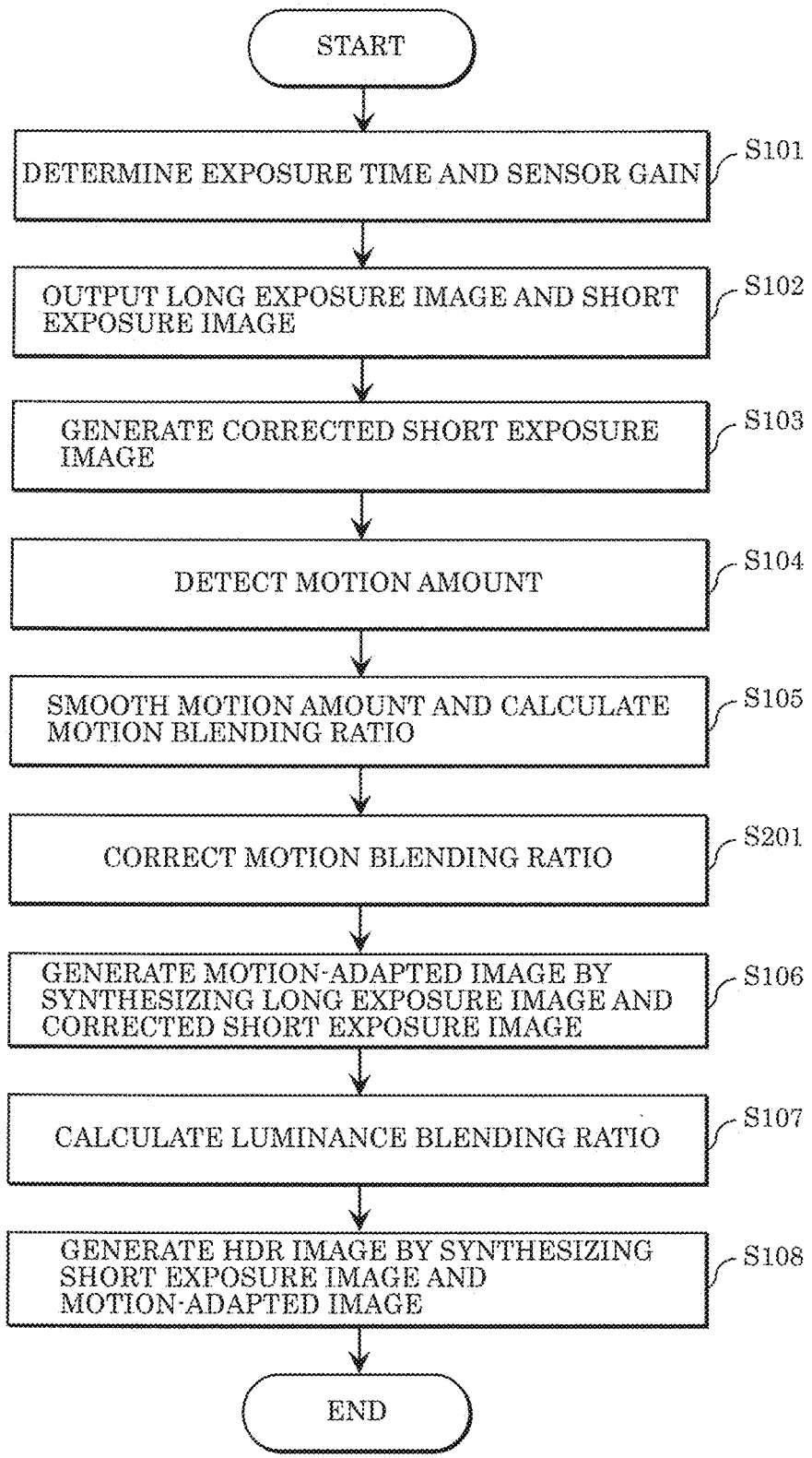
FIG. 9 is a flowchart showing a flow of operations of the image processor according to Embodiment 2.
Figure 10A:
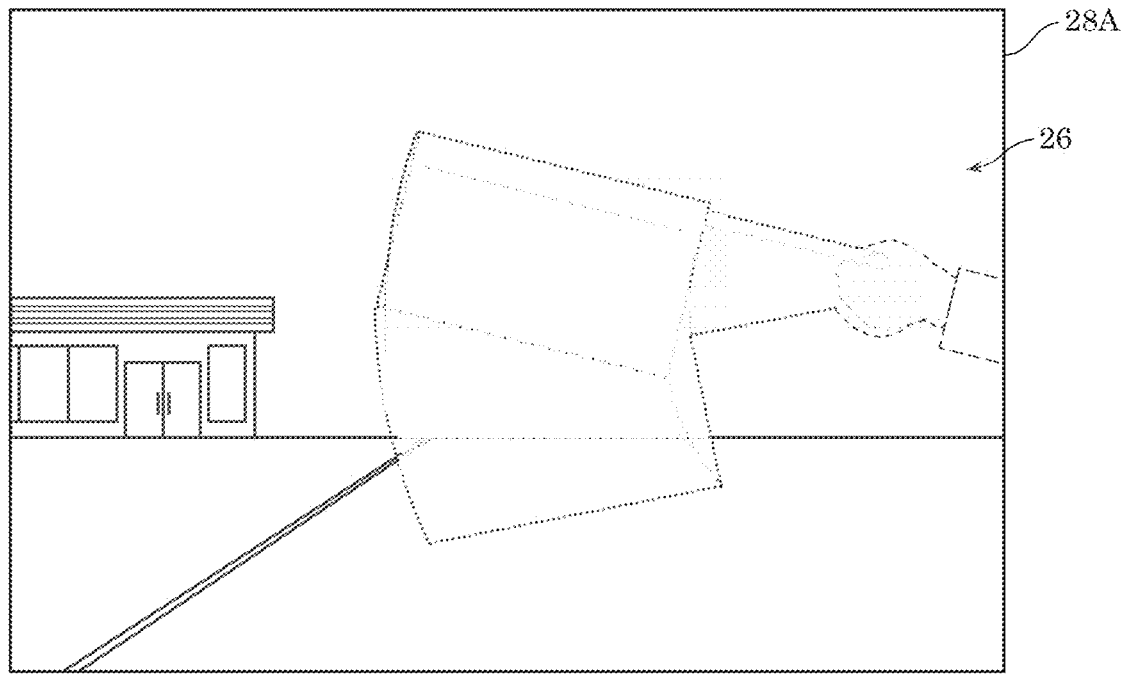
FIG. 10A is a schematic view showing an example of a long exposure image according to Embodiment 2.
Figure 10B:
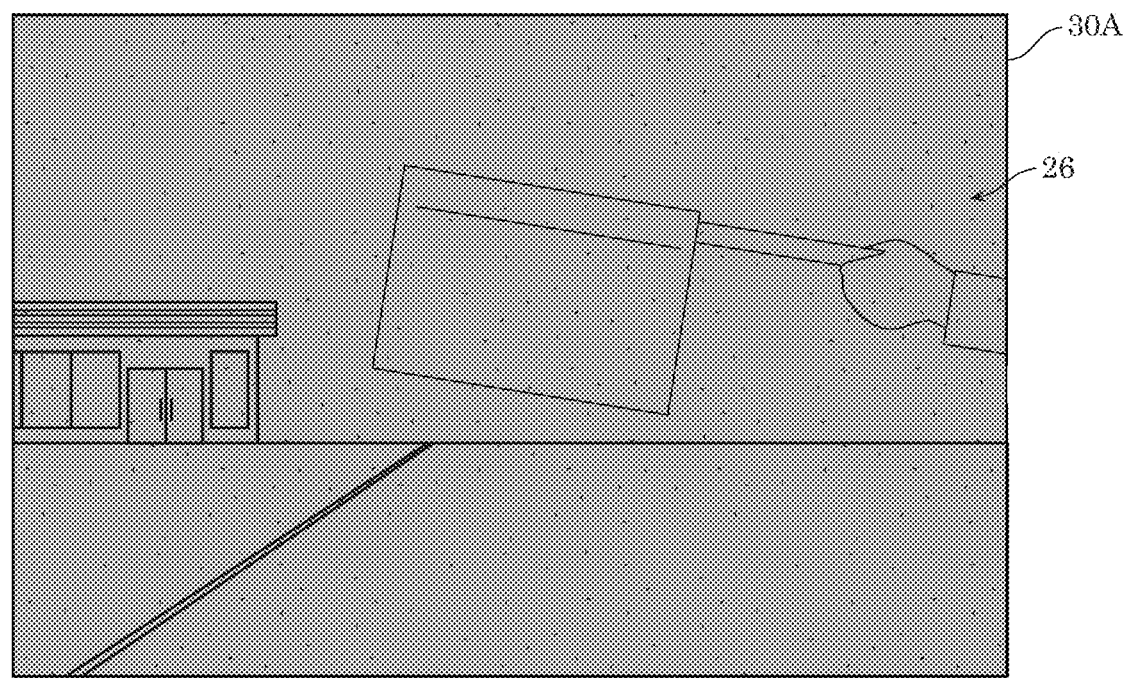
FIG. 10B is a schematic view showing an example of a short exposure image according to Embodiment 2.
Figure 10C:
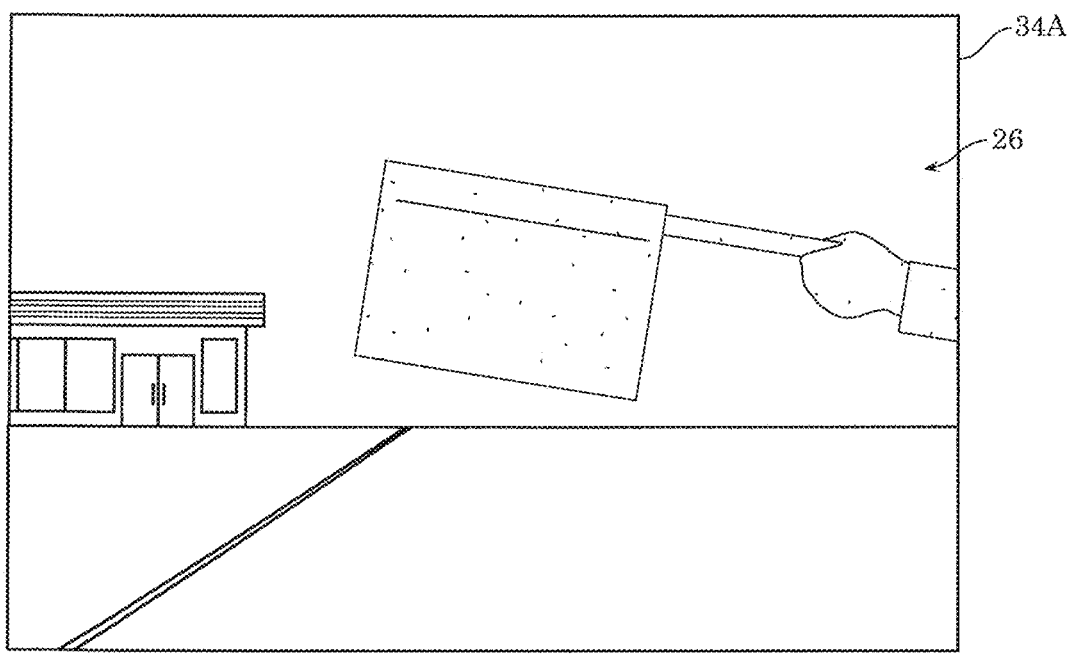
FIG. 10C is a schematic view showing an example of an HDR image generated by the image processor according to Embodiment 2.

Referring to FIGS. 9 to 10C, Operations of image processor 2A according to Embodiment 2 will be described below. FIG. 9 is a flowchart showing a flow of the operations of image processor 2A according to Embodiment 2. FIG. 10A is a schematic view showing an example of long exposure image 28A according to Embodiment 2. FIG. 10B is a schematic view showing an example of short exposure image 30A according to Embodiment 2. FIG. 10C is a schematic view showing an example of HDR image 34A generated by image processor 2A according to Embodiment 2. In the flowchart of FIG. 9, the same processing as in the flowchart of FIG. 3 is indicated by the same step number and the explanation thereof is omitted.

In the following explanation, subject 26 is captured by image sensor 4 in dark conditions.

As shown in FIG. 9, steps S101 to S105 are performed as in Embodiment 1. In step S101, when determining the first exposure time, the first sensor gain, the second exposure time, and the second sensor gain, sensor controller 6A outputs information on the determined first sensor gain to motion blending ratio calculator 12A.

In step S102, image sensor 4 outputs, for example, long exposure image 28A as illustrated in FIG. 10A and short exposure image 30A as illustrated in FIG. 10B. In the present embodiment, subject 26 is dark and thus the first sensor gain determined by sensor controller 6A is higher than that of Embodiment 1. This causes noise in short exposure image 30A as illustrated in FIG. 10B. In FIG. 10B, dots indicate the noise of short exposure image 30A.

After step S105, based on the information on the first sensor gain from sensor controller 6A, motion blending ratio calculator 12A corrects the calculated motion blending ratio such that the ratio of the corrected short exposure image to the long exposure image in the motion-adapted image decreases as the first sensor gain increases (S201). In the present embodiment, the first sensor gain determined by sensor controller 6A is higher and thus motion blending ratio calculator 12A corrects the motion blending ratio such that the ratio of the corrected short exposure image to the long exposure image in the motion-adapted image is low.

Thereafter, steps S106 to S108 are performed as in Embodiment 1. In step S106, motion-adapted image synthesizer 14 generates the motion-adapted image by synthesizing, based on the corrected motion blending ratio from motion blending ratio calculator 12A, long exposure image 28A output from image sensor 4 and the corrected short exposure image output from level adjuster 8. At this point, noise increases as a luminance level in the corrected short exposure image increases. Since a motion-adapted image is generated by blending, in a lower rate, the pixels of the corrected short exposure image to the pixels of long exposure image 28A, noise decreases in the motion-adapted image.

In step S108, HDR image synthesizer 18 generates, for example, HDR image 34A as illustrated in FIG. 10C. As illustrated in FIG. 10C, in HDR image 34A, a largely blurring image (a hand and a flag) in long exposure image 28A is replaced with an image of (a hand and a flag) the corrected short exposure image. Since the corrected short exposure image has a low motion blending ratio, noise hardly occurs in the image of the hand and the flag in HDR image 34A. In FIG. 10C, dots indicate the noise of HDR image 34A.

[2-3. Effect]

For example, if subject 26 is dark, more noise occurs in the corrected short exposure image by increasing the first sensor gain. At this point, if the motion blending ratio is not corrected, motion amount detector 10 erroneously detects the noise of the corrected short exposure image as a motion of subject 26. This may increase the motion blending ratio of the corrected short exposure image so as to cause more noise in HDR image 34A.

According to the present embodiment, motion blending ratio calculator 12A corrects the motion blending ratio such that the motion blending ratio of the corrected short exposure image to the long exposure image decreases as the first sensor gain increases. Thus, even if the first sensor gain increases, noise can be reduced in HDR image 34A. This can increase the S/N of HDR image 34.

According to the present embodiment, motion blending ratio calculator 12A corrects the motion blending ratio such that the motion blending ratio of the corrected short exposure image to the long exposure image decreases as the first sensor gain increases. Alternatively, the motion blending ratio may be corrected such that the motion blending ratio of the corrected short exposure image to the long exposure image decreases as the second sensor gain increases.

Embodiment 3

[3-1. Configuration of Image Processor]

Figure 11:
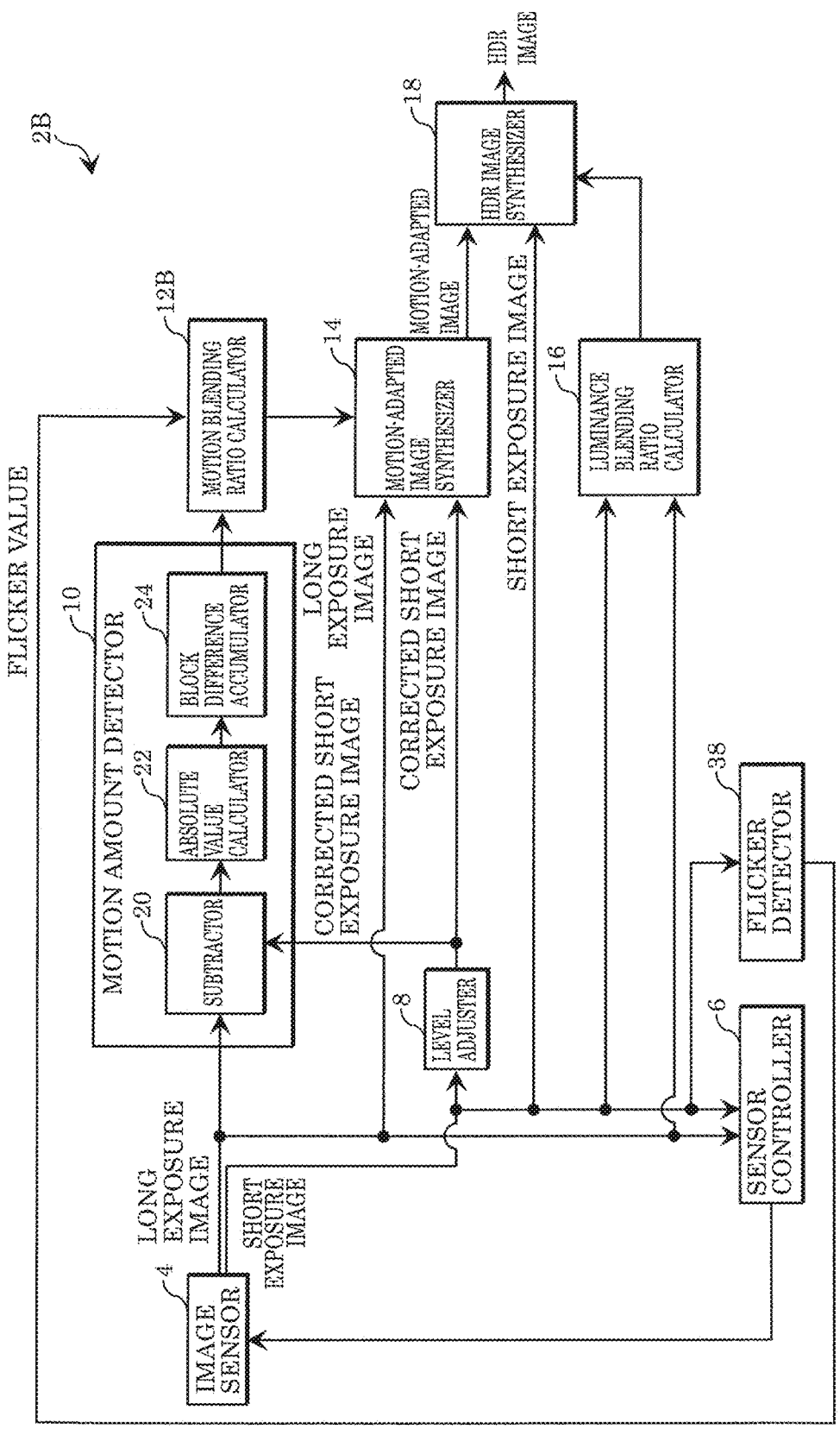
FIG. 11 is a block diagram showing a configuration of an image processor according to Embodiment 3.
Figure 12:
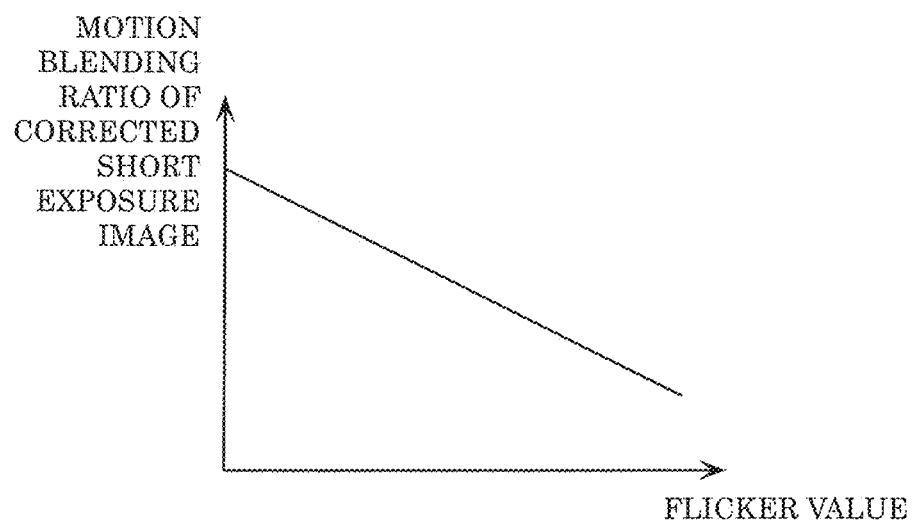
FIG. 12 is an explanatory drawing showing processing of a motion blending ratio calculator of the image processor according to Embodiment 3.

Referring to FIGS. 11 and 12, a configuration of image processor 2B according to Embodiment 3 will be described below. FIG. 11 is a block diagram showing the configuration of image processor 2B according to Embodiment 3. FIG. 12 is an explanatory drawing of processing of motion blending ratio calculator 12B of image processor 2B according to Embodiment 3.

As shown in FIG. 11, image processor 2B according to Embodiment 3 is different from Embodiment 1 in provision of flicker detector 38. Flicker detector 38 is configured to detect a flicker value of a short exposure image. The flicker value is a value indicating the amount of change of the luminance of a subject (hereinafter referred to as "flicker"). The luminance is changed by a periodic change of the luminance of a light source (for example, at 100 Hz or 120 Hz twice as high as a commercial frequency), e.g., a fluorescent lamp for illuminating the subject. Flicker detector 38 detects the flicker value of a short exposure image by detecting a change of the luminance of the short exposure image through, for example, fast Fourier transform (FFT) processing. Flicker detector 38 outputs the detected flicker value to motion blending ratio calculator 12B.

Furthermore, image processor 2B according to Embodiment 3 is different from Embodiment 1 in processing of motion blending ratio calculator 12B. Motion blending ratio calculator 12B corrects a motion blending ratio based on the flicker value from flicker detector 38. Specifically, as shown in FIG. 12, motion blending ratio calculator 12B corrects the motion blending ratio so as to reduce the ratio of a corrected short exposure image to a long exposure image in a motion-adapted image as the flicker value increases.

[3-2. Operations of Image Processor]

Figure 13A:
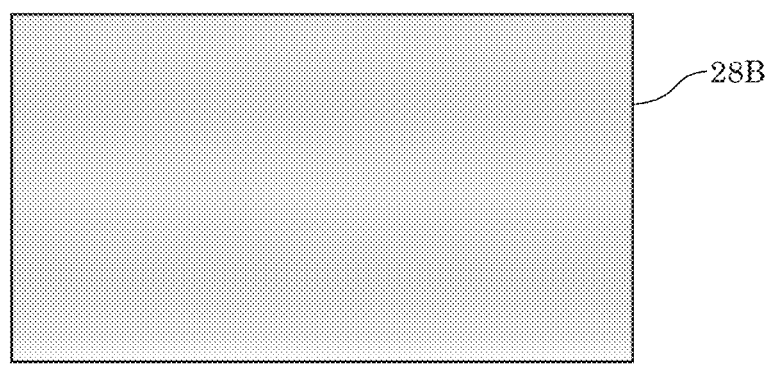
FIG. 13A is a schematic view showing an example of a long exposure image according to Embodiment 3.
Figure 13B:
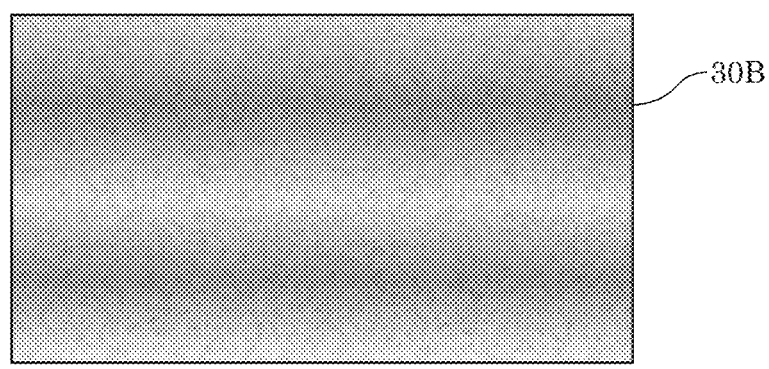
FIG. 13B is a schematic view showing an example of a short exposure image according to Embodiment 3.
Figure 13C:
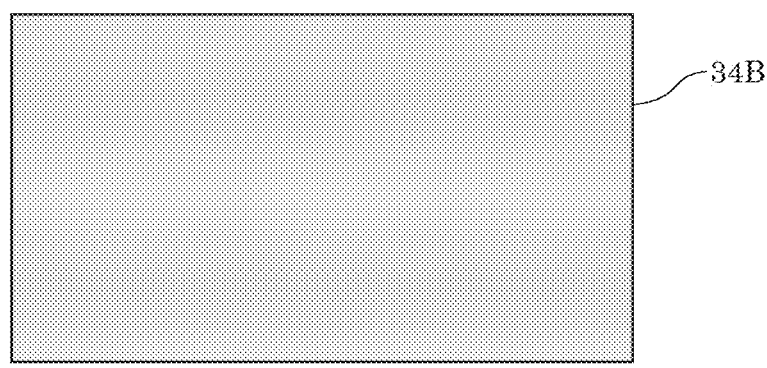
FIG. 13C is a schematic view showing an example of an HDR image generated by the image processor according to Embodiment 3.
Figure 14:
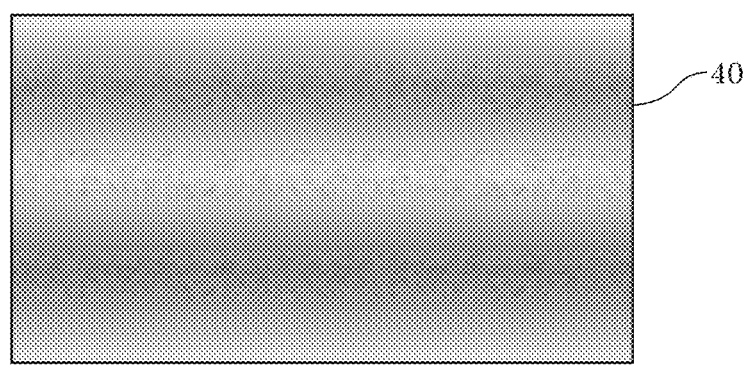
FIG. 14 is a schematic view illustrating an example of an HDR image generated by an image processor according to a Comparative Example.

Referring to FIGS. 13A to 14, Operations of image processor 2B according to Embodiment 3 will be described below. FIG. 13A is a schematic view showing an example of long exposure image 28B according to Embodiment 3. FIG. 13B is a schematic view showing an example of short exposure image 30B according to Embodiment 3. FIG. 13C is a schematic view showing an example of HDR image 34B generated by image processor 2B according to Embodiment 3. FIG. 14 is a schematic view illustrating an example of HDR image 40 generated by the image processor according to a Comparative Example. For the sake of explanation, a subject is not illustrated in FIGS. 13A to 14.

In the present embodiment, image sensor 4 outputs, for example, long exposure image 28B as illustrated in FIG. 13A and short exposure image 30B as illustrated in FIG. 13B. Since a first exposure time is shorter than a second exposure time, as shown in FIG. 13B, flicker occurs in short exposure image 30B. In FIG. 13B, the flicker of short exposure image 30B is indicated by gradation.

Motion blending ratio calculator 12B corrects the motion blending ratio based on the flicker value from flicker detector 38 such that the ratio of the corrected short exposure image to the long exposure image in the motion-adapted image decreases as the flicker value increases. In the present embodiment, as illustrated in FIG. 13B, flicker occurs in short exposure image 30B and thus motion blending ratio calculator 12B corrects the motion blending ratio such that the ratio of the corrected short exposure image to the long exposure image in the motion-adapted image is relatively low.

Hence, flicker occurs due to short exposure image 30B in the corrected short exposure image. Since a motion-adapted image is generated by blending, in a low motion blending ratio, the pixels of the corrected short exposure image to the pixels of long exposure image 28B, flicker decreases in the motion-adapted image. Thus, HDR image synthesizer 18 generates, for example, HDR image 34B as illustrated in FIG. 13C. As illustrated in FIG. 13C, the motion blending ratio of the corrected short exposure image to the long exposure image is low in HDR image 34B and thus flicker hardly occurs in HDR image 34B.

If the motion blending ratio is not corrected as described above, flicker may occur in an HDR image. If a motion blending ratio is calculated so as to increase the ratio of the corrected short exposure image to the long exposure image in the motion-adapted image even at the high flicker value, for example, HDR image 40 is generated as illustrated in FIG. 14. As illustrated in FIG. 14, the corrected short exposure image has a high motion blending ratio in HDR image 40, so that flicker occurs due to the corrected short exposure image in HDR image 40.

[3-3. Effect]

If the motion blending ratio is not corrected when flicker occurs in short exposure image 30B, motion amount detector 10 erroneously detects the flicker of the corrected short exposure image as a motion of a subject. This may increase the motion blending ratio of the corrected short exposure image to the long exposure image so as to cause flicker in HDR image 34B.

In the present embodiment, motion blending ratio calculator 12B corrects the motion blending ratio so as to reduce the ratio of the corrected short exposure image to the long exposure image in the motion-adapted image as the flicker value increases. This can suppress the occurrence of flicker in HDR image 34B even if flicker occurs in short exposure image 30B, thereby improving the S/N of HDR image 34B.

Embodiment 4

[4-1. Configuration of Image Processor]

Figure 15:
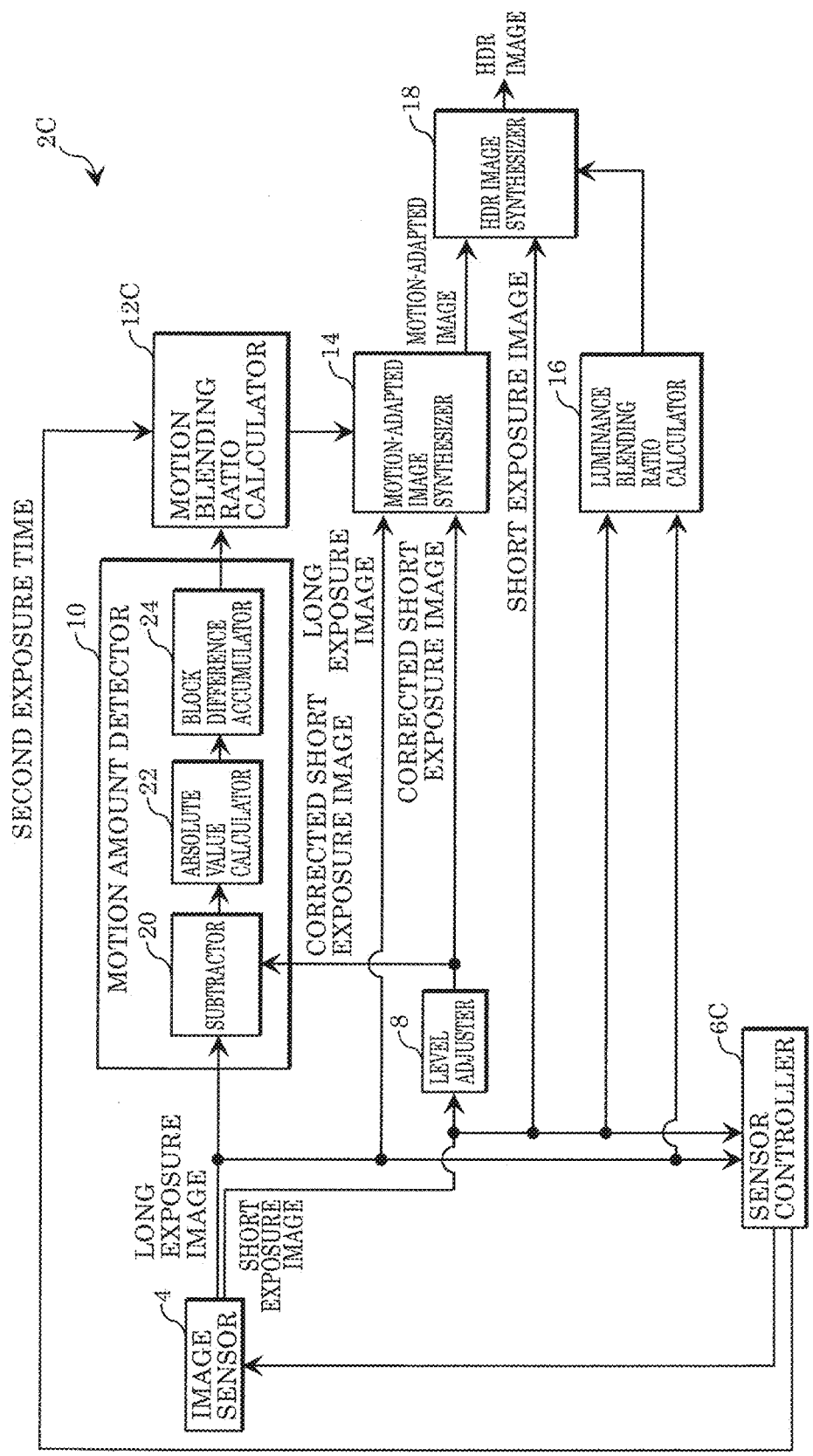
FIG. 15 is a block diagram showing a configuration of an image processor according to Embodiment 4.
Figure 16:
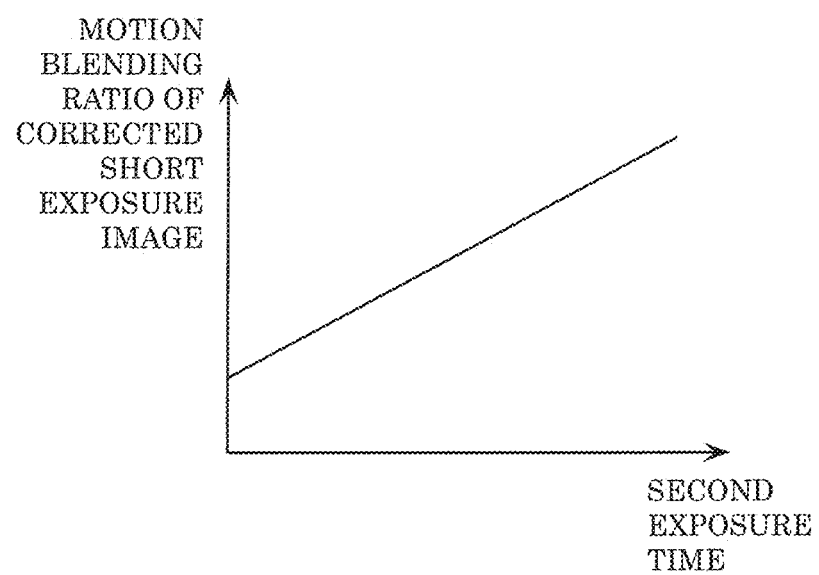
FIG. 16 is an explanatory drawing showing processing of a motion blending ratio calculator of the image processor according to Embodiment 4.

Referring to FIGS. 15 and 16, a configuration of image processor 2C according to Embodiment 4 will be described below. FIG. 15 is a block diagram showing the configuration of image processor 2C according to Embodiment 4. FIG. 16 is an explanatory drawing of processing of motion blending ratio calculator 12C of image processor 2C according to Embodiment 4.

As shown in FIG. 15, image processor 2C according to Embodiment 4 is different from Embodiment 1 in processing of sensor controller 6C and motion blending ratio calculator 12C.

When determining a first exposure time, a first sensor gain, a second exposure time, and a second sensor gain of image sensor 4 according to the brightness of a subject, sensor controller 6C outputs information on the determined second exposure time to motion blending ratio calculator 12C.

Motion blending ratio calculator 12C corrects a motion blending ratio based on the information on the second exposure time from sensor controller 6C. Specifically, as shown in FIG. 16, motion blending ratio calculator 12C corrects the motion blending ratio so as to reduce a ratio of a corrected short exposure image to a long exposure image in a motion-adapted image as the second exposure time decreases.

[4-2. Operations of Image Processor]

Figure 17A:
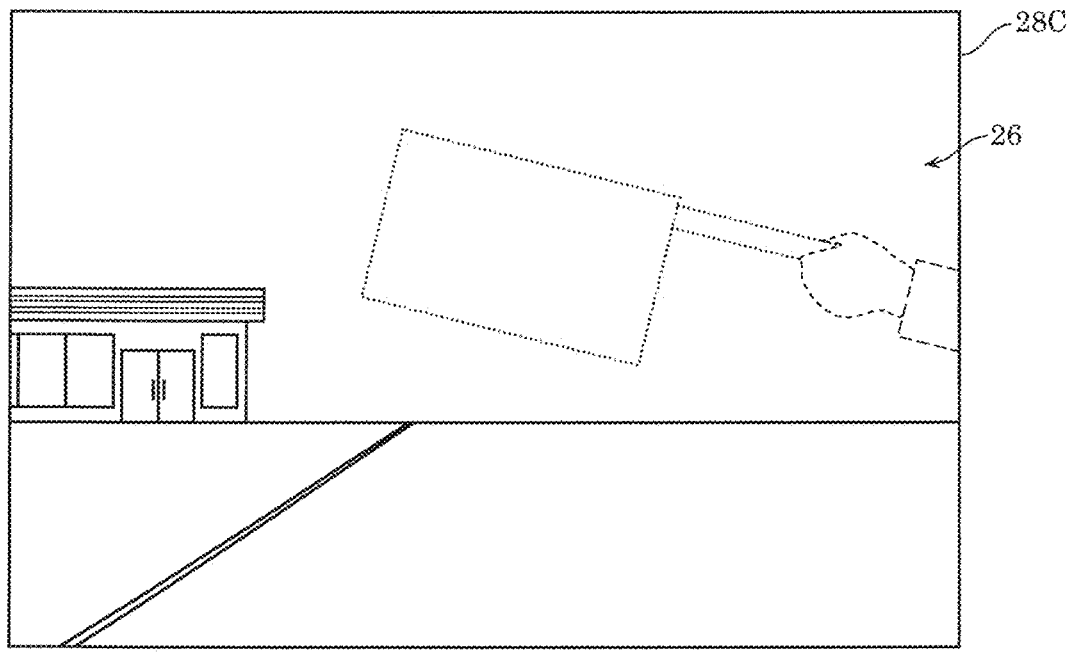
FIG. 17A is a schematic view showing an example of a long exposure image according to Embodiment 4.
Figure 17B:
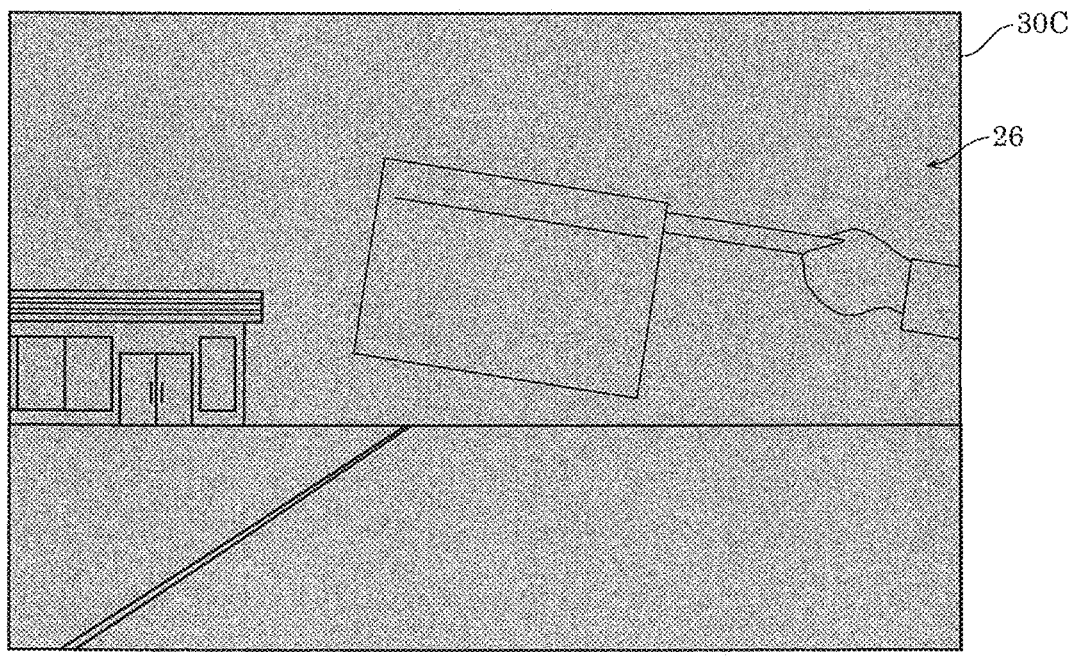
FIG. 17B is a schematic view showing an example of a short exposure image according to Embodiment 4.
Figure 17C:
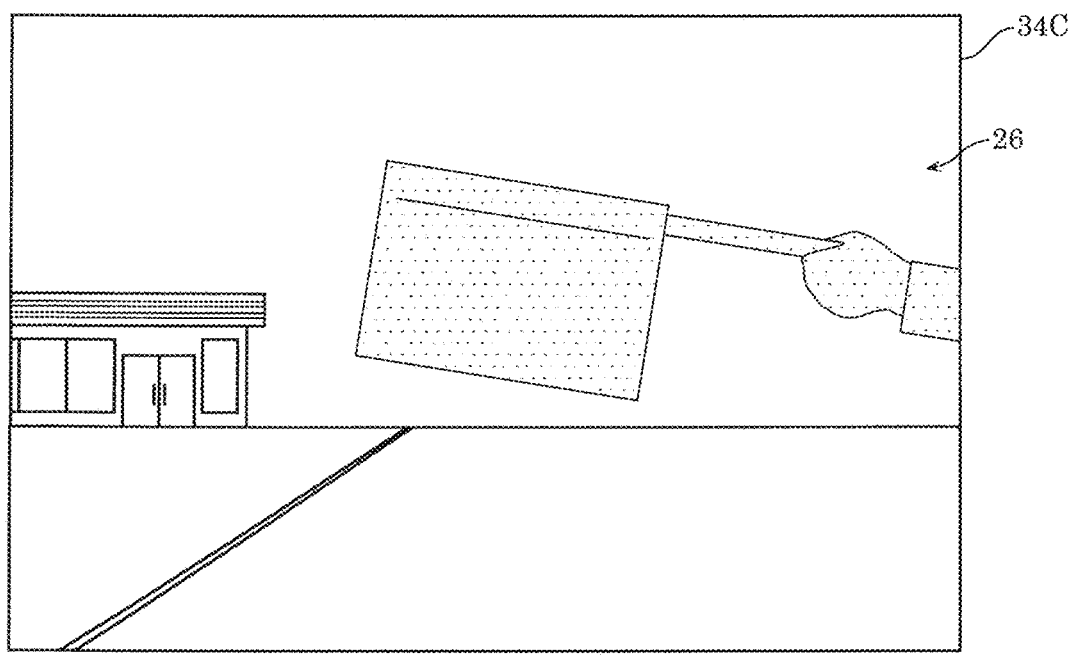
FIG. 17C is a schematic view showing an example of an HDR image generated by the image processor according to Embodiment 4.

Referring to FIGS. 17A to 17C, Operations of image processor 2C according to Embodiment 4 will be described below. FIG. 17A is a schematic view showing an example of long exposure image 28C according to Embodiment 4. FIG. 17B is a schematic view showing an example of short exposure image 30C according to Embodiment 4. FIG. 17C is a schematic view showing an example of HDR image 34C generated by image processor 2C according to Embodiment 4.

In the following explanation, subject 26 is captured by image sensor 4 in bright conditions.

In the present embodiment, image sensor 4 outputs, for example, long exposure image 28C as illustrated in FIG. 17A and short exposure image 30B as illustrated in FIG. 17B. Since subject 26 is bright, the first exposure time and the second exposure time that are determined by sensor controller 6C are shorter than those of Embodiment 1. Thus, as illustrated in FIG. 17A, the image of subject 26 hardly blurs in long exposure image 28C.

Based on the information on the second exposure time from sensor controller 6C, motion blending ratio calculator 12C corrects the motion blending ratio such that the ratio of the corrected short exposure image to the long exposure image in the motion-adapted image decreases as the second exposure time decreases. In the present embodiment, the second exposure time determined by sensor controller 6C is short and thus motion blending ratio calculator 12C corrects the motion blending ratio such that the ratio of the corrected short exposure image to the long exposure image in the motion-adapted image is relatively low.

Motion-adapted image synthesizer 14 generates the motion-adapted image by synthesizing, based on the motion blending ratio from motion blending ratio calculator 12C, long exposure image 28C output from image sensor 4 and the corrected short exposure image output from level adjuster 8. At this point, the motion-adapted image is generated by blending, in a low motion blending ratio, the pixels of the corrected short exposure image to the pixels of long exposure image 28C. This can suppress unnecessary replacement of long exposure image 28C with the corrected short exposure image for the image of subject 26 hardly blurring in long exposure image 28C. Therefore, noise caused by the corrected short exposure image can be reduced in the motion-adapted image.

HDR image synthesizer 18 generates, for example, HDR image 34C as illustrated in FIG. 17C. As illustrated in FIG. 17C, in HDR image 34C, a blurring image (a hand and a flag) in long exposure image 28C is replaced with an image of (a hand and a flag) the corrected short exposure image. Since the corrected short exposure image has a low motion blending ratio, noise hardly occurs in the image of the hand and the flag in HDR image 34C. In FIG. 17C, dots indicate the noise of HDR image 34C.

[4-3. Effect]

For example, if subject 26 is bright, the first exposure time and the second exposure time are reduced. At this point, if the motion blending ratio is not corrected, long exposure image 28C is unnecessarily replaced with the corrected short exposure image even though the image of subject 26 hardly blurs in long exposure image 28C, so that more noise occurs in the motion-adapted image due to the corrected short exposure image.

In the present embodiment, motion blending ratio calculator 12C corrects the motion blending ratio so as to reduce the ratio of the corrected short exposure image to the long exposure image in the motion-adapted image as the second exposure time decreases. Thus, even if the second exposure time is reduced, the S/N of HDR image 34C can be improved.

(Other Variations)

Although the image processors according to one or more aspects of the present disclosure have been described with reference to the embodiments as above, the present disclosure is not limited to these embodiments. Various modifications of the embodiments which those skilled in the art can conceive or desirable combinations of the structural elements and functions in the embodiments without materially departing from the present disclosure are also included in the present disclosure.

It should be noted that, in the above-described embodiments, each of the constituent elements may be implemented into a dedicated hardware or implemented by executing a software program suitable for the constituent element. Each of the constituent elements may be implemented when a program executing unit, such a central processing unit (CPU) or a processor, reads a software program from a recording medium, such as a hard disk or a semiconductor memory, and executes the readout software program.

It should also be noted that a part or all of the functions in the image processor according to each of the embodiments may be implemented by executing a program by a processor such as a central processing unit (CPU).

It should also be noted that a part or all of the constituent elements included in each of the above-described image processors may be implemented into an Integrated Circuit (IC) card or a single module which is attachable to and removable from the image processor. The IC card or the module is a computer system including a microprocessor, a ROM, a RAM, and the like. The IC card or the module may include the above-described super multi-function LSI. The microprocessor operates according to the computer program to cause the IC card or the module to execute its functions. The IC card or the module may have tamper resistance.

The present disclosure may be the above-above described methods. These methods may be a computer program executed by a computer, or digital signals forming the computer program. The present disclosure may be a computer-readable recording medium on which the computer program or the digital signals are recorded. Examples of the computer-readable recording medium are a flexible disk, a hard disk, a Compact Disc-Read Only Memory (CD-ROM), a magnetooptic disk (MO), a Digital Versatile Disc (DVD), a DVD-ROM, a DVD-RAM, a BD (Blu-ray® Disc), and a semiconductor memory. The present disclosure may be the digital signals recorded on the recording medium. The present disclosure may be implemented by transmitting the computer program or the digital signals via an electric communication line, a wired or wireless communication line, a network represented by the Internet, data broadcasting, and the like. The present disclosure may be a computer system including a microprocessor and a memory. The memory stores the computer program and the microprocessor operates according to the computer program. It is also possible that the program or the digital signals may be recorded onto the recording medium to be transferred, or may be transmitted via a network or the like, so that the program or the digital signals can be executed by a different independent computer system.

While various embodiments have been described herein above, it is to be appreciated that various changes in form and detail may be made without departing from the spirit and scope of the present disclosure as presently or hereafter claimed.

Further Information about Technical Background to this Application

The disclosures of the following Japanese Patent Applications including specification, drawings and claims are incorporated herein by references on their entirety: Japanese Patent Application No. 2018-225170 filed on Nov. 30, 2018.

INDUSTRIAL APPLICABILITY

The present disclosure is applicable to an image processor or the like for generating an HDR image by synthesizing, for example, a plurality of images with different exposure times.

What is claimed is:

1. An image processor that generates a high dynamic range (HDR) image of a subject, the image processor comprising:
an image sensor that outputs (i) a first image of the subject captured with a first sensor gain in a first exposure time and (ii) a second image of the subject captured with a second sensor gain in a second exposure time longer than the first exposure time, the first image and the second image being output in one frame time;
a sensor controller that, when a brightness of the subject changes, (i) controls a first exposure sensitivity to cause the first image to have a first brightness and (ii) controls a second exposure sensitivity to cause the second image to have a second brightness, the first exposure sensitivity being a product of the first exposure time multiplied by the first sensor gain, the second exposure sensitivity being a product of the second exposure time multiplied by the second sensor gain;
a level adjuster that generates a corrected image from the first image by adjusting a luminance level of the first image to be substantially equal to a luminance level of the second image;
a motion amount detector that detects a motion amount of the subject based on a difference in a pixel value between pixels co-located in the corrected image and the second image;
a motion blending ratio calculator that calculates a motion blending ratio based on the motion amount, the motion blending ratio being a ratio of the corrected image to the second image when the corrected image is blended with the second image;

a motion-adapted image synthesizer that generates a motion-adapted image by synthesizing the corrected image and the second image based on the motion blending ratio; and an HDR image synthesizer that generates the HDR image by synthesizing the motion-adapted image and the first image together, wherein when the subject becomes darker, the sensor controller controls the first exposure sensitivity and the second exposure sensitivity to cause the first sensor gain to be at most the second sensor gain.

2. The image processor according to claim 1, wherein the motion blending ratio calculator corrects the motion blending ratio to decrease a ratio of the corrected image to the second image in the motion-adapted image as the first sensor gain increases.

3. The image processor according to claim 1, further comprising a flicker detector that detects a flicker value of the first image, wherein the motion blending ratio calculator corrects the motion blending ratio to decrease a ratio of the corrected image to the second image in the motion-adapted image as the flicker value increases.

4. The image processor according to claim 1, wherein the motion blending ratio calculator corrects the motion blending ratio to decrease a ratio of the corrected image to the second image in the motion-adapted image as the second exposure time decreases.

5. An image processing method for generating an HDR image of a subject, the method comprising:
   (a) outputting a first image of the subject captured with a first sensor gain in a first exposure time and a second image of the subject captured with a second sensor gain in a second exposure time longer than the first exposure time, the first image and the second image being output in one frame time;
   (b) controlling first exposure sensitivity to cause the first image to have a first brightness and controlling second exposure sensitivity to cause the second image to have a second brightness, the first exposure sensitivity being a product of the first exposure time multiplied by the first sensor gain, the second exposure sensitivity being a product of the second exposure time multiplied by the second sensor gain, the controlling of the first exposure sensitivity and second exposure sensitivity being performed when a brightness of the subject changes;
   (c) generating a corrected image from the first image by adjusting a luminance level of the first image to be substantially equal to a luminance level of the second image;
   (d) detecting a motion amount of the subject based on a difference in a pixel value between pixels co-located in the corrected image and the second image;
   (e) calculating a motion blending ratio based on the motion amount, the motion blending ratio being a ratio of the corrected image to the second image when the corrected image is blended with the second image;
   (f) generating a motion-adapted image by synthesizing the corrected image and the second image based on the motion blending ratio; and
   (g) generating the HDR image by synthesizing the motion-adapted image and the first image together, wherein in the (b) controlling of the first exposure sensitivity and the second exposure sensitivity, when the subject becomes darker, the first exposure sensitivity and the second exposure sensitivity are controlled to cause the first sensor gain to be at most the second sensor gain.

6. The image processing method according to claim 5, wherein in the (e) calculating of the motion blending ratio, the motion blending ratio is corrected to decrease a ratio of the corrected image to the second image in the motion-adapted image as the first sensor gain increases.

7. The image processing method according to claim 5, wherein in the (e) calculating of the motion blending ratio, the motion blending ratio is corrected to decrease a ratio of the corrected image to the second image in the motion-adapted image as a flicker value of the first image increases.

8. The image processing method according to claim 5, wherein in the (e) calculating of the motion blending ratio, the motion blending ratio is corrected to decrease a ratio of the corrected image to the second image in the motion-adapted image as the second exposure time decreases.

* * * * *